United States Patent
Kim et al.

(10) Patent No.: US 12,283,255 B2
(45) Date of Patent: *Apr. 22, 2025

(54) DISPLAY APPARATUS AND LIGHT APPARATUS THEREOF

(71) Applicant: SAMSUNG ELECTRONICS CO., LTD., Suwon-si (KR)

(72) Inventors: Sungyeol Kim, Suwon-si (KR); Sungbok Yang, Suwon-si (KR); Seokwoo Yong, Suwon-si (KR); Kyehoon Lee, Suwon-si (KR); Junsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,845

(22) Filed: Oct. 13, 2023

(65) Prior Publication Data
US 2024/0046893 A1 Feb. 8, 2024

Related U.S. Application Data

(63) Continuation of application No. 17/863,918, filed on Jul. 13, 2022, now Pat. No. 11,837,182, which is a
(Continued)

(30) Foreign Application Priority Data

Dec. 3, 2020 (KR) ........................ 10-2020-0167251
Dec. 23, 2020 (KR) ........................ 10-2020-0182552

(51) Int. Cl.
*G09G 3/34* (2006.01)
*G02F 1/133* (2006.01)
(Continued)

(52) U.S. Cl.
CPC ...... *G09G 3/3426* (2013.01); *G02F 1/133601* (2021.01); *G02F 1/133603* (2013.01); *G02F 1/133606* (2013.01); *G09G 3/3648* (2013.01)

(58) Field of Classification Search
CPC ......... G02F 1/133601; G02F 1/133603; G02F 1/133612; G09G 3/3648; G09G 3/3406; G09G 3/3426
See application file for complete search history.

(56) References Cited

U.S. PATENT DOCUMENTS 7,956,544 B2  6/2011  Kang et al.
8,093,827 B2  1/2012  Lee et al.
(Continued)

FOREIGN PATENT DOCUMENTS

CN    102103840 A    6/2011
CN    102576520 A    7/2012
(Continued)

OTHER PUBLICATIONS

Communication dated Nov. 2, 2023, issued by European Patent Office in European Patent Application No. 21194729.6.
(Continued)

*Primary Examiner* — Xuemei Zheng
(74) *Attorney, Agent, or Firm* — Sughrue Mion, PLLC

(57) ABSTRACT

A display apparatus includes: a liquid crystal panel; and a light apparatus on which the liquid crystal panel is disposed, the light apparatus including: a substrate; a plurality of dimming blocks including a first dimming block and a second dimming block disposed immediately next to the first dimming block, each of the plurality of dimming blocks including at least one respective light source disposed on a first side of the substrate; and a plurality of driving devices disposed on the first side of the substrate and including a first driving device disposed in the first dimming block and a
(Continued)

second driving device disposed in the second dimming block, each driving device of the plurality of driving devices being configured to provide a driving current to the at least one respective light source included in a respective one of the plurality of dimming blocks, wherein the first driving device and the second driving device are disposed at relatively different positions respectively within the first dimming block and the second dimming block.

19 Claims, 21 Drawing Sheets

Related U.S. Application Data continuation of application No. 17/473,283, filed on Sep. 13, 2021, now Pat. No. 11,410,619, which is a continuation of application No. 17/350,735, filed on Jun. 17, 2021, now Pat. No. 11,227,556, which is a continuation of application No. PCT/KR2021/002832, filed on Mar. 8, 2021.

(51) Int. Cl.
*G02F 1/1335* (2006.01)
*G02F 1/13357* (2006.01)
*G09G 3/36* (2006.01)

(56) References Cited

U.S. PATENT DOCUMENTS

| | | | |
|---|---|---|---|
| 8,531,385 B2 | 9/2013 | Kim et al. | |
| 9,140,929 B2 | 9/2015 | Bae et al. | |
| 9,300,948 B2 | 3/2016 | Cho | |
| 9,599,292 B2 | 3/2017 | Jagt et al. | |
| 9,870,740 B2 | 1/2018 | Park | |
| 10,067,385 B2 | 9/2018 | Jeon et al. | |
| 10,201,049 B1 | 2/2019 | Xie | |
| 10,455,653 B1 | 10/2019 | Watanabe | |
| 10,860,135 B2 | 12/2020 | Yoo et al. | |
| 10,916,210 B2 | 2/2021 | Suzuki | |
| 11,107,399 B2 | 8/2021 | Yanase et al. | |
| 11,158,269 B2 | 10/2021 | Ahn et al. | |
| 11,227,556 B1* | 1/2022 | Kim | G09G 3/3406 |
| 11,360,603 B2 | 6/2022 | Yamazaki et al. | |
| 11,373,605 B1* | 6/2022 | Kim | G09G 3/2092 |
| 11,410,619 B2* | 8/2022 | Kim | G09G 3/3611 |
| 11,417,287 B2 | 8/2022 | Kim et al. | |
| 11,514,834 B2 | 11/2022 | Jeong et al. | |
| 11,837,182 B2* | 12/2023 | Kim | G02F 1/133606 |
| 2007/0176198 A1 | 8/2007 | Lee | |
| 2009/0073109 A1 | 3/2009 | Shin et al. | |
| 2009/0256492 A1 | 10/2009 | Lee et al. | |
| 2010/0052564 A1 | 3/2010 | Park et al. | |
| 2010/0109562 A1* | 5/2010 | Shen | G02F 1/133603 315/294 |
| 2010/0134522 A1 | 6/2010 | De Rijck | |
| 2011/0050668 A1* | 3/2011 | Park | G09G 3/3426 345/84 |
| 2011/0062874 A1 | 3/2011 | Knapp | |
| 2011/0063214 A1 | 3/2011 | Knapp | |
| 2011/0063268 A1 | 3/2011 | Knapp | |
| 2011/0068699 A1 | 3/2011 | Knapp | |
| 2011/0069960 A1 | 3/2011 | Knapp | |
| 2011/0096560 A1 | 4/2011 | Ryu et al. | |
| 2011/0141004 A1 | 6/2011 | Kwon | |
| 2011/0205256 A1 | 8/2011 | Park | |
| 2011/0242437 A1 | 10/2011 | Yoo | |
| 2011/0285685 A1 | 11/2011 | Naito | |
| 2012/0032202 A1 | 2/2012 | Ogata et al. | |
| 2012/0086628 A1 | 4/2012 | Ichioka | |
| 2012/0086684 A1 | 4/2012 | Ichioka | |
| 2012/0169968 A1 | 7/2012 | Ishimori | |
| 2012/0320627 A1 | 12/2012 | Araki et al. | |
| 2015/0009649 A1 | 1/2015 | Jagt et al. | |
| 2016/0282670 A1 | 9/2016 | Jeon et al. | |
| 2018/0130429 A1 | 5/2018 | Son | |
| 2018/0233094 A1* | 8/2018 | Kumamoto | G09G 3/20 |
| 2019/0086727 A1 | 3/2019 | Dibbad | |
| 2019/0302815 A1 | 10/2019 | Tanaka et al. | |
| 2020/0051484 A1 | 2/2020 | Yashiki | |
| 2020/0091459 A1 | 3/2020 | Senoo | |
| 2020/0152707 A1 | 5/2020 | Won | |
| 2020/0159054 A1 | 5/2020 | Jeong et al. | |
| 2020/0160796 A1 | 5/2020 | Ahn | |
| 2020/0174526 A1 | 6/2020 | Jeong | |
| 2020/0184905 A1 | 6/2020 | Park | |
| 2020/0185641 A1 | 6/2020 | Jeong | |
| 2020/0193915 A1 | 6/2020 | Noh | |
| 2020/0194516 A1 | 6/2020 | Kim | |
| 2020/0210043 A1 | 7/2020 | Yoo et al. | |
| 2020/0220098 A1 | 7/2020 | Tsai | |
| 2020/0294445 A1 | 9/2020 | Pyo | |
| 2020/0411598 A1 | 12/2020 | Gwon | |
| 2021/0091144 A1 | 3/2021 | Won | |
| 2021/0096423 A1 | 4/2021 | Shin | |
| 2021/0110752 A1 | 4/2021 | Kim | |
| 2021/0158801 A1 | 5/2021 | Park | |
| 2021/0183987 A1 | 6/2021 | Lee | |
| 2021/0200361 A1 | 7/2021 | Park | |
| 2021/0200381 A1 | 7/2021 | Kang | |
| 2021/0202668 A1 | 7/2021 | Kwon | |
| 2021/0272528 A1 | 9/2021 | Goto et al. | |
| 2021/0364861 A1* | 11/2021 | Lum | H05B 47/105 |

FOREIGN PATENT DOCUMENTS

| | | |
|---|---|---|
| CN | 103797597 A | 5/2014 |
| CN | 106019698 A | 10/2016 |
| CN | 107797958 A | 3/2018 |
| CN | 110456540 A | 11/2019 |
| CN | 110783373 A | 2/2020 |
| CN | 111199716 A | 5/2020 |
| CN | 111210750 A | 5/2020 |
| CN | 111381711 A | 7/2020 |
| CN | 114930445 A | 8/2022 |
| JP | 2016-186649 A | 10/2016 |
| JP | 2019203934 A | 11/2019 |
| JP | WO2020/013194 A1 | 1/2020 |
| JP | WO2020/049949 A1 | 3/2020 |
| KR | 10-2006-0001570 A | 1/2006 |
| KR | 10-2009-0028124 A | 3/2009 |
| KR | 10-2009-0108461 A | 10/2009 |
| KR | 10-2010-0065253 A | 6/2010 |
| KR | 10-2010-0120616 A | 11/2010 |
| KR | 10-2011-0023686 A | 3/2011 |
| KR | 10-2011-0035836 A | 4/2011 |
| KR | 10-2011-0115470 A | 10/2011 |
| KR | 10-2012-0006025 A | 1/2012 |
| KR | 10-2012-0036660 A | 4/2012 |
| KR | 10-2012-0036661 A | 4/2012 |
| KR | 10-2014-0038460 A | 3/2014 |
| KR | 10-2014-0063852 A | 5/2014 |
| KR | 10-1410496 B1 | 6/2014 |
| KR | 10-1441984 B1 | 9/2014 |
| KR | 10-2015-0026414 A | 3/2015 |
| KR | 10-1528884 B1 | 6/2015 |
| KR | 10-2016-0114328 A | 10/2016 |
| KR | 10-1706578 B1 | 2/2017 |
| KR | 10-2017-0025110 A | 3/2017 |
| KR | 10-2018-0062224 A | 6/2018 |
| KR | 10-2020-0018215 A | 2/2020 |
| KR | 10-2020-0058623 A | 5/2020 |
| KR | 10-2020-0082509 A | 7/2020 |
| WO | 2020/049949 A1 | 3/2020 |

OTHER PUBLICATIONS

Communication dated Feb. 15, 2022 issued by the European Patent Office in counterpart European Application No. 21 194 729.6.
Communication dated Feb. 3, 2022 issued by the European Patent Office in counterpart European Application No. 21194729.6.

(56) References Cited

OTHER PUBLICATIONS

Office Action dated Jan. 19, 2022 issued by the United States Patent and Trademark Office in U.S. Appl. No. 17/473,243.
Communication dated Jan. 24, 2022 issued by the United States Intellectual Property Office in counterpart U.S. Appl. No. 17/473,311.
Communication dated Mar. 2, 2022 issued by the Korean Intellectual Property Office in Korean Application No. 10-2021-0189509.
Communication dated Sep. 9, 2021, issued by the United States Patent and Trademark Office in U.S. Appl. No. 17/350,735.
Communication issued Nov. 26, 2021 by the Korean Intellectual Property Office in Korean Application No. 10-2020-0182552.
International Search Report dated Aug. 30, 2021 issued by the International Searching Authority in counterpart International Application No. PCT/KR2021/002832 (PCT/ISA/210).
Notice of Allowance issued in prior U.S. Appl. No. 17/473,283 mailed May 4, 2022.
Office Action issued in prior U.S. Appl. No. 17/473,283 mailed Jan. 13, 2022.
Communication dated Sep. 14, 2022, issued by the China National Intellectual Property Administration in Chinese Application No. 202210207830.6.
Office Action issued in parent U.S. Appl. No. 17/863,918 mailed Feb. 21, 2023.
Notice of Allowance issued in parent U.S. Appl. No. 17/863,918 mailed Jul. 27, 2023.
Communication dated May 14, 2024, issued by the Korean Intellectual Property Office in Korean Patent Application No. 10-2024-0051020.
Communication dated Oct. 10, 2024, issued by Intellectual Property India in Indian Application No. 202317015948.

\* cited by examiner

DISPLAY APPARATUS AND LIGHT APPARATUS THEREOF

CROSS-REFERENCE TO RELATED APPLICATIONS

This application is a Continuation of U.S. application Ser. No. 17/863,918, filed on Jul. 13, 2022, which is a Continuation of U.S. application Ser. No. 17/473,283, filed on Sep. 13, 2021 (now U.S. Pat. No. 11,410,619), which is a Continuation of U.S. application Ser. No. 17/350,735 filed on Jun. 17, 2021 (now U.S. Pat. No. 11,227,556), which is a bypass continuation application of International Application No. PCT/KR2021/002832, filed on Mar. 8, 2021, which is based on and claims priority under 35 U.S.C. § 119 to Korean Patent Application No. 10-2020-0167251, filed on Dec. 3, 2020, in the Korean Intellectual Property Office, and Korean Patent Application No. 10-2020-0182552, filed on Dec. 23, 2020, in the Korean Intellectual Property Office, the disclosures of which are incorporated by reference herein in their entireties.

BACKGROUND

1. Field

The disclosure relates to a display apparatus and a light apparatus thereof, and more particularly, to a thin display apparatus and a light source module thereof.

2. Description of Related Art

In general, display apparatuses are a type of output devices for displaying obtained or stored electrical information for the user by converting the electrical information to visual information. Display apparatuses are used in various fields such as homes or work places.

There are many different display apparatuses such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, other display devices for reproducing images like advertisements or films, or other various kinds of audio/video systems.

The display apparatus includes a light source module to convert electrical information to visual information, and the light source module includes a plurality of light sources to separately emit light. Each of the plurality of light sources may include, for example, a light emitting diode (LED) or an organic LED (OLED). For example, the LED or the OLED may be mounted on a circuit board or a board.

Thickness of display apparatuses is becoming thinner. To implement such a thin display apparatus, the light source module is getting thinner as well.

As the thickness of the light source module becomes thinner, the light source module may have an optical defect (e.g., mura) that is recognizable to the user. For example, the optical defect may be caused by an arrangement of LEDs or an arrangement of driving circuits in the thin light source module.

SUMMARY

Provided are a display apparatus and light apparatus thereof, capable of preventing or suppressing an optical defect (e.g., mura).

Additional aspects will be set forth in part in the description that follows and, in part, will be apparent from the description, or may be learned by practice of presented embodiments.

According to an aspect of the disclosure, there is provided a display apparatus including: a liquid crystal panel; and a light apparatus on which the liquid crystal panel is disposed, the light apparatus including: a substrate; a plurality of dimming blocks including a first dimming block and a second dimming block disposed immediately next to the first dimming block, each dimming block of the plurality of dimming blocks including at least one respective light source disposed on a first side of the substrate; and a plurality of driving devices disposed on the first side of the substrate and including a first driving device disposed in the first dimming block and a second driving device disposed in the second dimming block, each driving device of the plurality of driving devices being configured to provide a driving current to the at least one respective light source included in a respective one of the plurality of dimming blocks, wherein the first driving device and the second driving device are disposed at relatively different positions respectively within the first dimming block and the second dimming block.

An arrangement of the first driving device in the first dimming block may be different from an arrangement of the second driving device in the second dimming block that is adjacent to the first dimming block.

The plurality of dimming blocks may be arranged in a plurality of rows and a plurality of columns, and an arrangement of the first driving device in the first dimming block may be different from an arrangement of the second driving device in the second dimming block that is arranged in a same row or column as the first dimming block and is adjacent to the first dimming block.

The first driving device may be arranged outside a virtual line that is defined by the second driving device and a third driving device among the plurality of driving devices closest to the first driving device.

The plurality of dimming blocks may emit light with different brightnesses.

The first driving device may be further configured to supply the driving current to light sources included in at least two dimming blocks among the plurality of dimming blocks.

The first driving device may be arranged in the first dimming block among the at least two dimming blocks.

A third dimming block in which the first driving device is arranged and a fourth dimming block in which none among the plurality of driving devices is arranged, may be alternately arranged.

An arrangement of the first driving device in the at least two dimming blocks may be different from an arrangement of the second driving device in at least other two dimming blocks.

The display apparatus may further include a dimming driver provided on a second surface of the substrate, the dimming driver being configured to provide a dimming signal to the plurality of driving devices.

The dimming driver may be further configured to provide the dimming signal to the plurality of driving devices in an active matrix scheme.

The plurality of driving devices may be arranged in a plurality of rows and a plurality of columns, and the dimming driver may be further configured to provide a scan signal to driving devices arranged in one row among the plurality of rows; and provide the dimming signal to driving devices arranged in one column among the plurality of columns.

The at least one light source may include: a light emitting diode (LED) directly contacting wiring on the substrate; and an optical dome covering the LED.

The LED includes a distributed Bragg reflector (DBR) formed on a surface from which light is emitted.

According to an aspect of the disclosure, there is provided a light apparatus including: a substrate; a plurality of dimming blocks including a first dimming block and a second dimming block disposed immediately next to the first dimming block, each of the plurality of dimming blocks including at least one respective light source disposed on a first side of the substrate; and a plurality of driving devices disposed on the first side of the substrate and including a first driving device disposed in the first dimming block and a second driving device disposed in the second dimming block, each of the plurality of driving devices being configured to provide a driving current to the at least one respective light source included in a respective one of the plurality of dimming blocks, wherein the first driving device and the second driving device are disposed at relatively different positions respectively within the first dimming block and the second dimming block.

An arrangement of the first driving device in the first dimming block may be different from an arrangement of the second driving device in the second dimming block that is adjacent to the first dimming block.

The plurality of dimming blocks may be arranged in a plurality of rows and a plurality of columns, and an arrangement of the first driving device in the first dimming block may be different from an arrangement of the second driving device in the second dimming block that is arranged in a same row or column as the first dimming block and is adjacent to the first dimming block.

The first driving device may be arranged outside a virtual line that is defined by the second driving device and a third driving device among the plurality of driving devices closest to the first driving device.

According to an aspect of the disclosure, there is provided a display apparatus including: a liquid crystal panel; and a light apparatus including: a substrate; a plurality of dimming blocks, each dimming block of the plurality of dimming blocks including at least one light source provided on a first surface of the substrate; and a plurality of driving devices provided on the first surface of the substrate, each driving device of the plurality of driving devices being configured to supply a driving current to the at least one light source included in a respective dimming block among the plurality of dimming blocks, wherein a first driving device among the plurality of driving devices is arranged outside a virtual line that is defined by a second driving device and a third driving device among the plurality of driving devices closest to the first driving device.

An arrangement of the first driving device in a first dimming block among the plurality of dimming blocks may be different from an arrangement of the second driving device in a second dimming block among the plurality of dimming blocks that is adjacent to the first dimming block and an arrangement of the third driving device in a third dimming block among the plurality of dimming block that is adjacent to the first dimming block.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
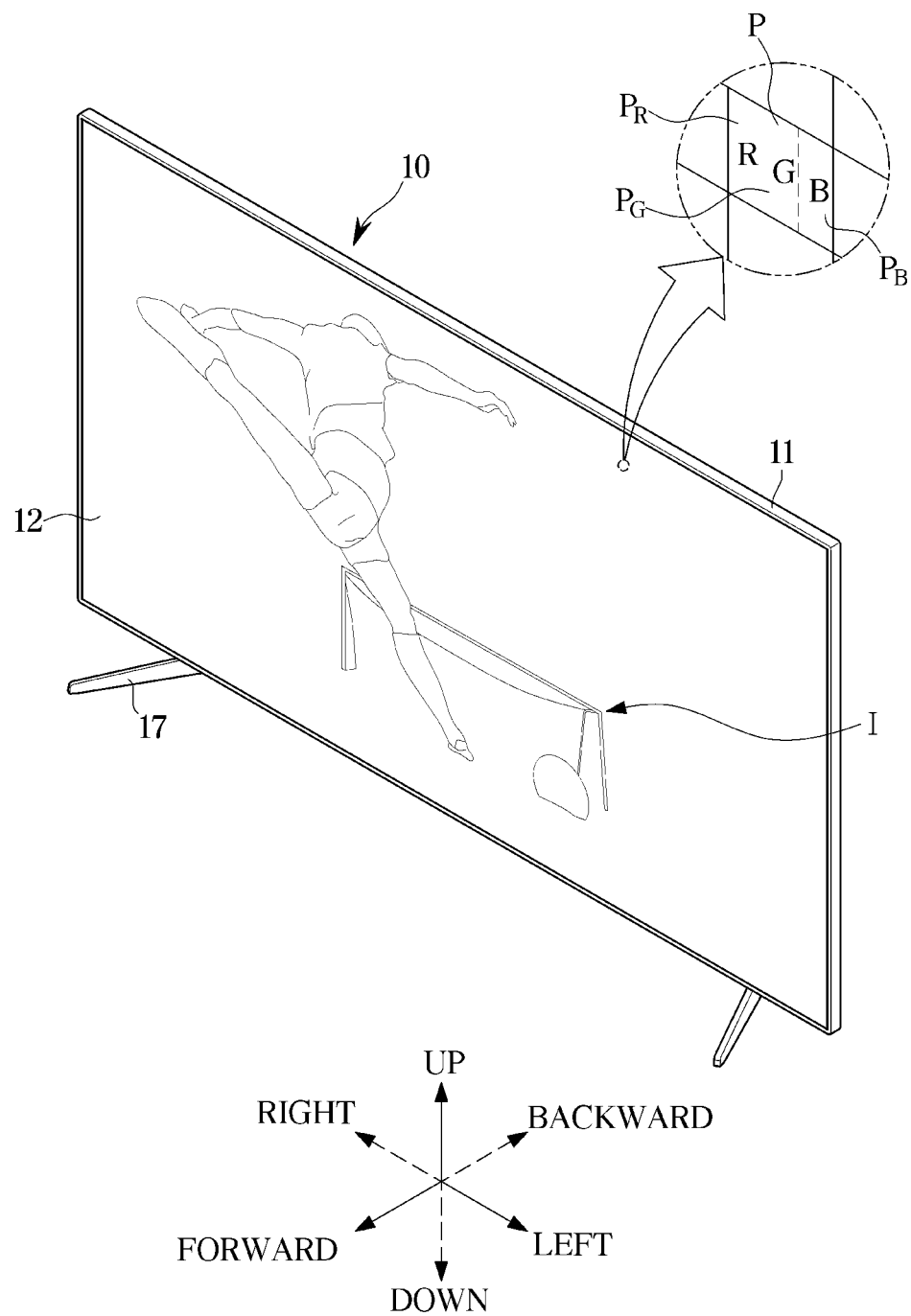
FIG. 1 is an exterior view of a display apparatus, according to an embodiment.

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections may not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 is an exterior view of a display apparatus, according to an embodiment.

A display apparatus 10 is a device for processing image signals received from the outside and visually presenting the processed image. In the following description, it is assumed that the display apparatus 10 is a television (TV), but embodiments of the disclosure are not limited thereto. For example, the display apparatus 10 may be implemented in various forms, such as a monitor, a portable multimedia device, a portable communication device, and any device capable of visually presenting images, without being limited thereto.

The display apparatus 10 may be a large format display (LFD) installed outdoors such as on a rooftop of a building or at a bus stop. The display apparatus 10 is not, however, exclusively installed outdoors, but may be installed at any place, even indoors with a lot of foot traffic, e.g., at subway stations, shopping malls, theaters, offices, stores, etc.

The display apparatus 10 may receive contents including video and audio signals from various content sources and output video and audio corresponding to the video and audio signals. For example, the display apparatus 10 may receive content data through a broadcast receiving antenna or a cable, receive content data from a content reproducing device, or receive content data from a content providing server of a content provider.

As shown in FIG. 1, the display apparatus 10 includes a main body 11, a screen 12 for displaying an image I, and a stand 17 supporting the main body 11 and the screen 12.

The main body 11 forms the exterior of the display apparatus 10, and components for the display apparatus 10 to display the image I or perform many different functions may be included in the main body 11. Although the main body 11 of FIG. 1 is shaped like a flat plate, it is not limited thereto. For example, the main body 11 may have the form of a curved plate.

The screen 12 may be formed on the front of the main body 11 for displaying the image I. For example, the screen 12 may display still images or moving images. For example, the screen 12 may display two dimensional (2D) plane images, or three dimensional (3D) stereographic images using parallax of both eyes of the user.

The screen 12 may include, e.g., a self-luminous panel (e.g., a light emitting diode (LED) panel or an organic LED (OLED) panel) capable of emitting light at first hand, or non-luminous panel (e.g., a liquid crystal panel) capable of passing or blocking light emitted from, e.g., a light apparatus (e.g., a backlight).

A plurality of pixels P are formed on the screen 12, and the image I displayed on the screen 12 may be formed by the light emitted by each of the plurality of pixels P. For example, the light emitted by each of the plurality of pixels P may be combined like a mosaic into the image I on the screen 12.

Each of the plurality of pixels P may emit light in various colors and brightnesses. Each of the plurality of pixels P may include subpixels PR, PG, and PB to emit different colors of light.

The subpixels PR, PG, and PB may include a red subpixel PR to emit red light, a green subpixel PG to emit green light, and blue subpixel PB to emit blue light PB. For example, the red light may have wavelengths of about 620 nanometers (nm, a billionth of a meter) to about 750 nm; green light may have wavelengths of about 495 nm to about 570 nm; blue light may have wavelengths of about 430 nm to about 495 nm.

By combinations of the red light of the red subpixel PR, the green light of the green subpixel PG, and the blue light of the blue subpixel PB, each of the plurality of pixels P may emit various brightnesses and colors of light.

Figure 2:
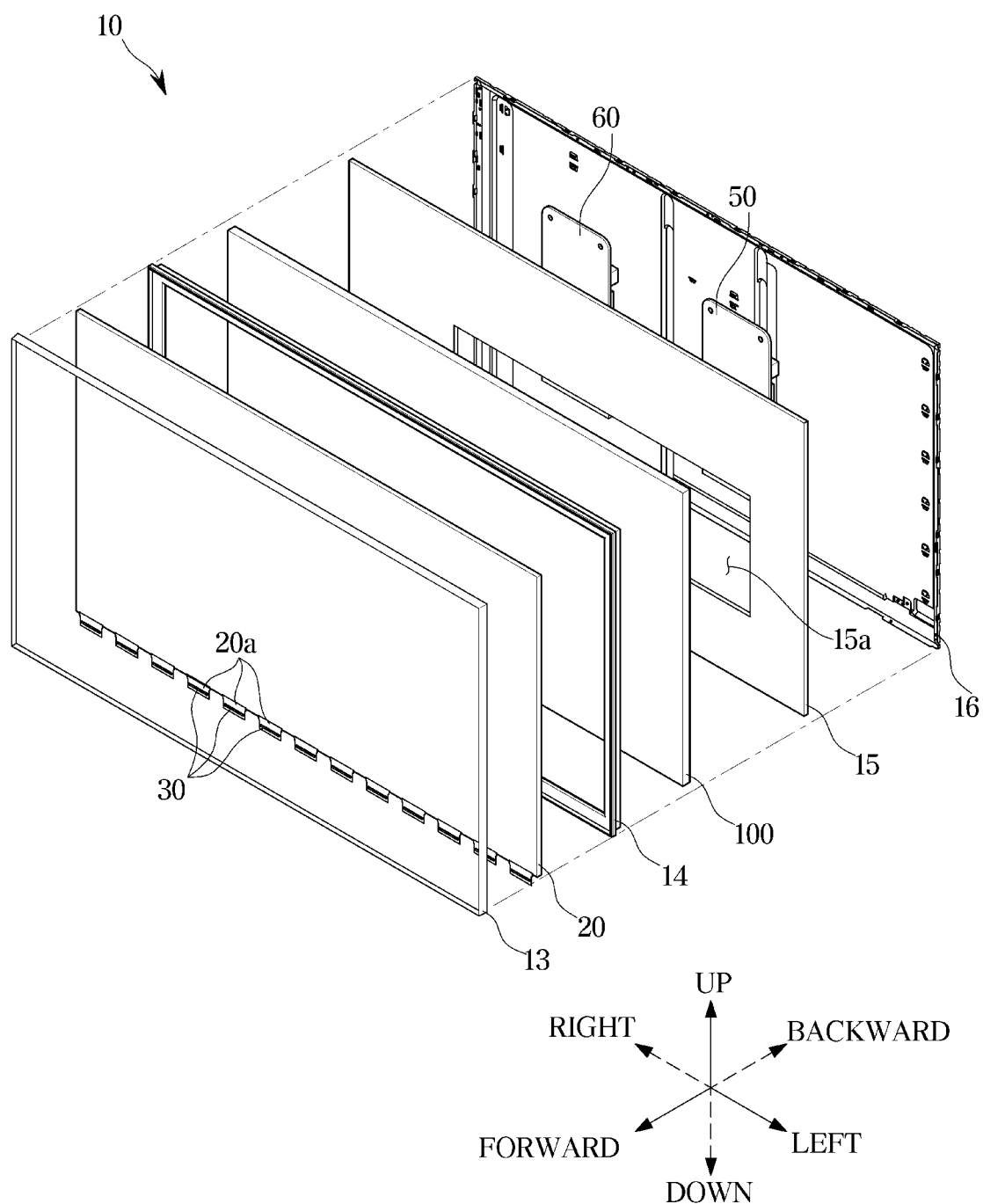
FIG. 2 is an exploded view of a display apparatus, according to an embodiment.
Figure 3:
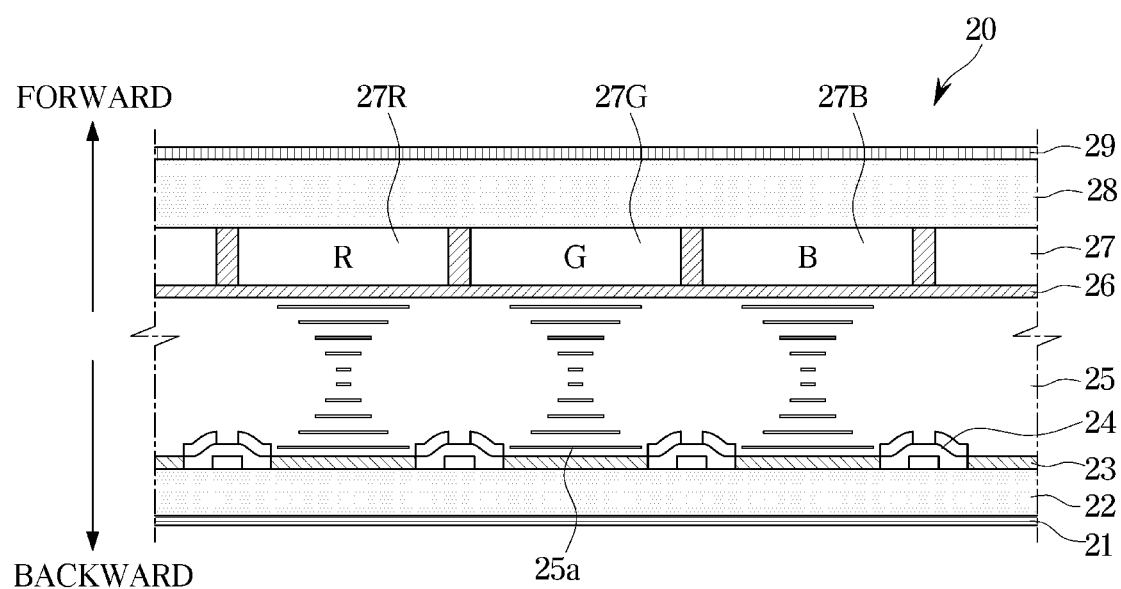
FIG. 3 is a plan view of a liquid crystal panel of a display apparatus; according to an embodiment.

FIG. 2 is an exploded view of a display apparatus, according to an embodiment. FIG. 3 is a plan view of a liquid crystal panel of a display apparatus, according to an embodiment.

As shown in FIG. 2, the main body 11 may contain many different kinds of components to create the image I on the screen S.

For example, a light apparatus 100, which is a surface light source, a liquid crystal panel 20 for blocking or passing the light emitted from the light apparatus 100, a control assembly 50 for controlling operations of the light apparatus 100 and the liquid crystal panel 20, and a power assembly 60 for supplying power to the light apparatus 100 and the liquid crystal panel 20 are equipped in the may body 11. Furthermore, the main body 11 includes a bezel 13, a frame middle mold 14, a bottom chassis 15, and a rear cover 16 to support and secure the liquid crystal panel 20, the light apparatus 100, the control assembly 50, and the power assembly 60. An opening 15a is formed at the bottom chassis 15 to electrically connect the light apparatus 100 to the control assembly 50 and the power assembly 60.

The light apparatus 100 may include a point light source for emitting monochromatic light or white light, and refract, reflect, and scatter the light emitted from the point light source to convert the light to uniform surface light. In this way, the light apparatus 100 may emit the uniform surface light in a forward direction by refracting, reflecting and scattering the light emitted from the point light source.

The light apparatus 100 will now be described in more detail.

The liquid crystal panel 20 is arranged in front of the light apparatus 100 for blocking or passing the light emitted from the light apparatus 100 to produce the image I.

The front surface of the liquid crystal panel 20 may form the screen S of the aforementioned display apparatus 10, and the liquid crystal panel 20 may include the plurality of pixels P. The plurality of pixels P included in the liquid crystal panel 20 may separately block or pass the light from the light apparatus 100, and the light having passed the plurality of pixels P forms the image I to be displayed on the screen S.

For example, as shown in FIG. 3, the liquid crystal panel 20 may include a first polarizer film 21, a first transparent substrate 22, a pixel electrode 23, a thin film transistor (TFT) 24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

The first polarizer film 21 and the second polarizer film 29 are arranged on outer sides of the first and second transparent substrates 22 and 28. The first and second polarizer films 21 and 29 may each pass particular light while blocking the other light. For example, the first polarizer film 21 may pass polarized light in a first direction while blocking differently polarized light. Furthermore, the second polarizer film 29 may pass polarized light in a second direction while blocking differently polarized light. The first and second directions may be perpendicular to each other. As a result, the polarized light that has passed the first polarizer film 21 may not pass the second polarizer film 29.

The color filter 27 may be arranged on the inner side of the second transparent substrate 28. The color filter 27 may include, for example, a red color filter 27R for passing red light, a green color filter 27G for passing green light, and a blue color filter 27B for passing blue light, and the red, green, blue color filters 27R, 27G, and 27B may be arranged side by side. An area in which the color filter 27 is formed corresponds to the pixel P as described above. An area where the red color filter 27R is formed corresponds to the red subpixel PR; an area where the green color filter 27G is formed corresponds to the green subpixel PG; an area where the blue color filter 27B is formed corresponds to the blue subpixel PB.

The pixel electrode 23 may be arranged on the inner side of the first transparent substrate 22, and the common electrode 26 may be arranged on the inner side of the second transparent substrate 28. The pixel electrode 23 and the common electrode 26 are formed of a conductive metal material, and may produce an electric field to change arrangement of liquid crystal molecules 115a that form the liquid crystal layer 25, which will be described below.

The thin film transistor (TFT) 24 is arranged on the inner side of the second transparent substrate 22. The TFT 24 may pass or block the current flowing in the pixel electrode 23. For example, depending on whether the TFT 24 is turned on (closed) or turned off (opened), an electric field may be formed or removed from between the pixel electrode 23 and the common electrode 26.

The liquid crystal layer 25 is formed between the pixel electrode 23 and the common electrode 26 and filled with liquid crystal molecules 25a. The liquid crystals are in an intermediate state between solid (crystal) and fluid. The liquid crystals reveal an optical property according to a change in electric field. For example, the liquid crystal may have varying directions of arrangement of molecules that form the liquid crystal, according to a change in electric field. Consequently, the optical property of the liquid crystal layer 25 may be changed according to whether there is an electric field passing the liquid crystal layer 25.

On one side of the liquid crystal panel 20, provided are a cable 20a for transmitting image data to the liquid crystal panel 20 and a display driver integrated circuit (DDI) 30 (hereinafter, called a 'panel driver') for processing digital image data to output an analog image signal.

The cable 20a may electrically connect between the control assembly 50/the power assembly 60 and the panel driver 30 and further between the panel driver 30 and the liquid crystal panel 20. The cable 20a may include, e.g., a bendable flexible flat cable or film cable.

The panel driver 30 may receive image data and power from the control assembly 50/power assembly 60 through the cable 20a, and transmit image data and a driving current to the liquid crystal panel 20 through the cable 20a.

Furthermore, the cable 110b and the panel driver 30 may be integrally implemented as a film cable, a chip on film (COF), a table carrier package (TCP), etc. In other words, the panel driver 30 may be arranged on the cable 20b. It is not, however, limited thereto, and the panel driver 30 may be arranged on the liquid crystal panel 20.

The control assembly 50 may include a control circuit for controlling operations of the liquid crystal panel 20 and the light apparatus 100. The control circuit may process image data received from an external content source, transmit image data to the liquid crystal panel 20, and transmit dimming data to the light apparatus 100.

The power assembly 60 may supply power to the liquid crystal panel 20 and the light apparatus 100 so as for the light apparatus 100 to output surface light and for the liquid crystal panel 20 to block or pass the light from the light apparatus 100.

The control assembly 50 and the power assembly 60 may be implemented with printed circuit boards (PCBs) and various circuits mounted on the PCBs. For example, a power circuit may include a power circuit board, and a capacitor, a coil, a resistor, a processor, etc., which are mounted on the power circuit board. Furthermore, the control circuit may include a control circuit board with a memory and a processor mounted thereon.

Figure 4:
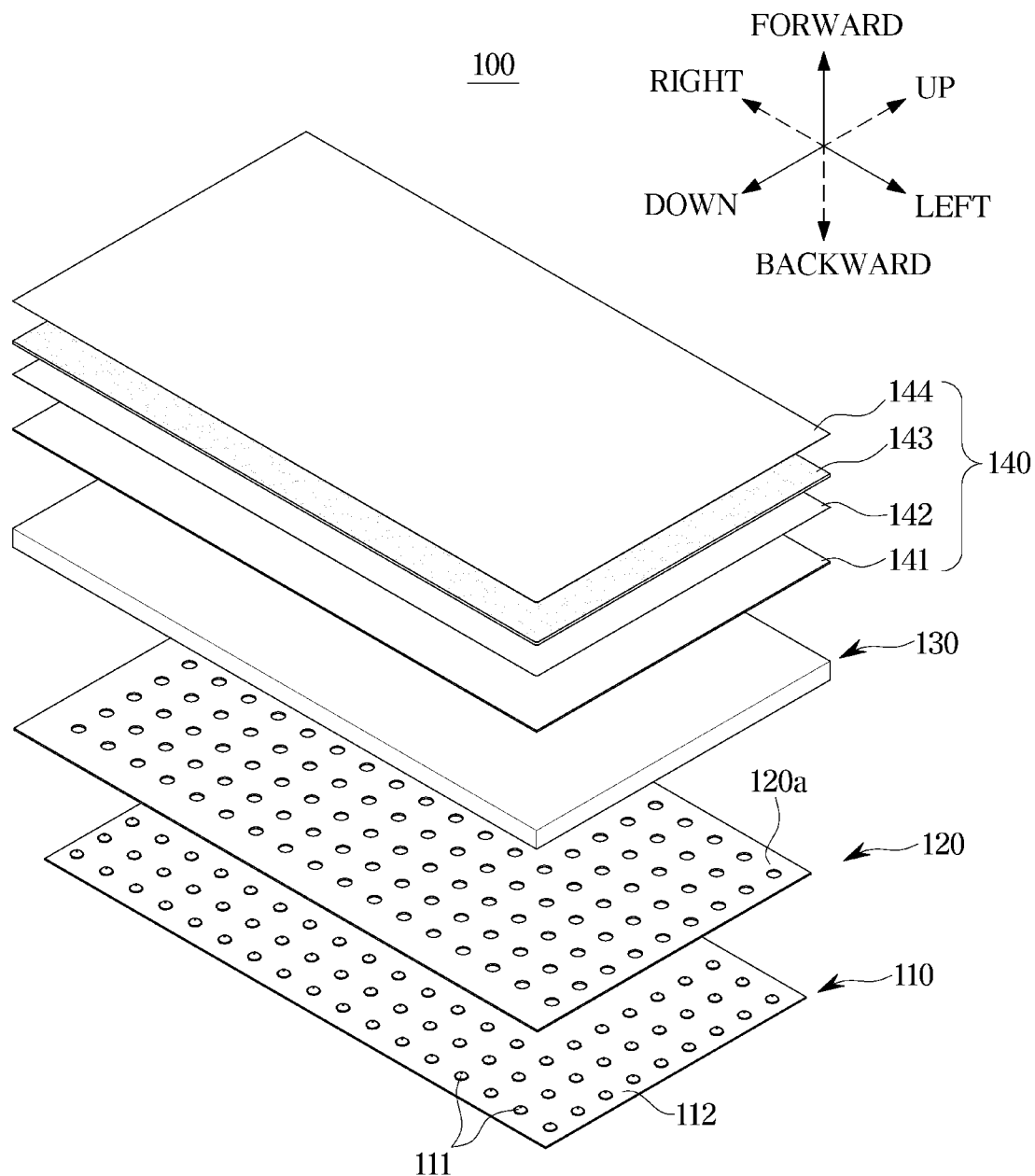
FIG. 4 is an exploded view of a light apparatus of a display apparatus, according to an embodiment.
Figure 5:
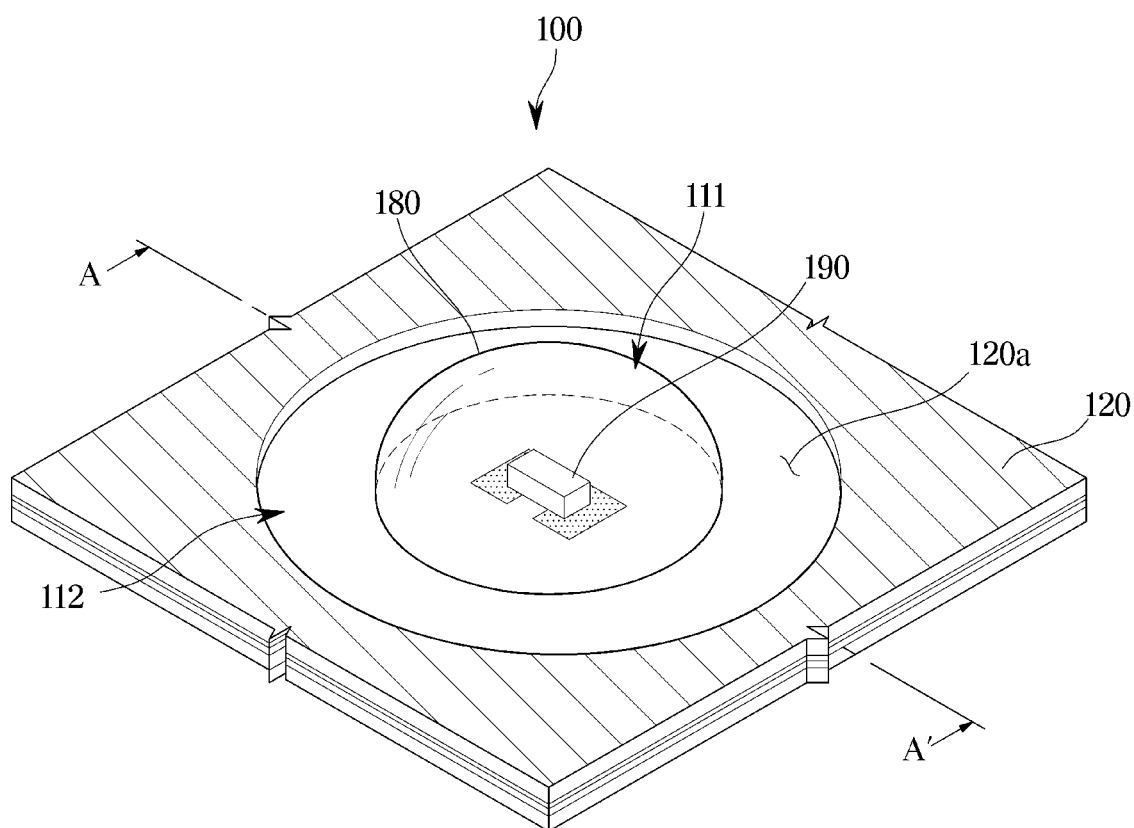
FIG. 5 is a perspective view of a light source included in a light apparatus, according to an embodiment.
Figure 6:
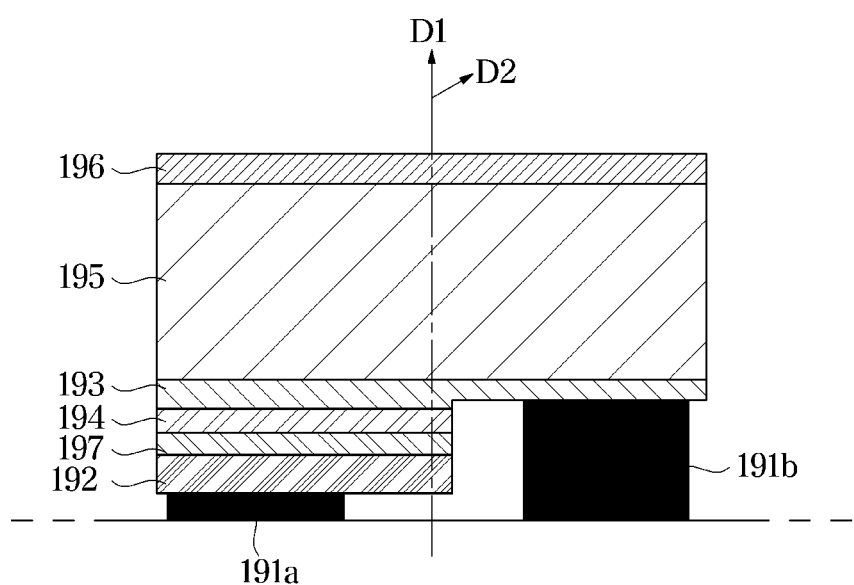
FIG. 6 is a cross-sectional view of a light emitting diode (LED) included in a light apparatus, according to an embodiment.

FIG. 4 is an exploded view of a light apparatus of a display apparatus, according to an embodiment. FIG. 5 is a perspective view of a light source included in a light apparatus, according to an embodiment. FIG. 6 is a cross-sectional view of a light emitting diode (LED) included in a light apparatus, according to an embodiment.

As shown in FIG. 4, the light apparatus 100 includes a light source module 110 for generating light, a reflecting sheet 120 for reflecting light, a diffuser plate 130 for uniformly diffusing light, and an optical sheet 140 for enhancing brightness of output light.

The light source module 110 may include a plurality of light sources 111 for emitting light, and a substrate 112 for supporting/fixing the plurality of light sources 111.

The plurality of light sources 111 may be arranged in a predefined pattern to emit light with uniform brightness. The plurality of light sources 111 may be arranged such that a light source is equi-distant from its neighboring light sources.

For example, as shown in FIG. 4, the plurality of light sources 111 may be arranged in rows and columns. Accordingly, the plurality of light sources may be arranged such that neighboring four light sources form almost a rectangle. Furthermore, a light source is located to be adjacent to four other light sources, and the distances between the light source and the four neighboring light sources are almost the same.

In another example, the plurality of light sources may be arranged in multiple rows, and a light source belonging to a row may be placed in the middle of two light sources belonging to two neighboring rows. Accordingly, the plurality of light sources may be arranged such that neighboring three light sources form almost a triangle. In this case, a light source is located to be adjacent to six other light sources, and the distances between the light source and the six neighboring light sources are almost the same.

The arrangement of the plurality of light sources 111 is not, however, limited thereto, and the plurality of light sources 111 may be arranged in various ways to emit light in even brightness.

The light sources 111 may employ devices capable of emitting monochromatic light (light having a particular wavelength, e.g., blue light) or white light (mixed light of red light, green light, and blue light) to various directions when powered.

Each of the plurality of light sources 111 includes an LED 190 and an optical dome 180.

The thinner the thickness of the display apparatus 10, the thinner the thickness of the light apparatus 100. To make the light apparatus 100 become thinner, each of the plurality of light sources 111 gets thinner and the structure becomes simpler.

The LED 190 may be attached directly to the substrate 112 in a method of chip on board (COB). In other words, the light source 111 may include the LED 190 with an LED chip or an LED die attached directly to the substrate 112 without extra packaging.

The LED 190 may be manufactured in a flip chip type. The LED 190 of the flip chip type may not use an intermediate medium such as a metal lead (wire) or a ball grid array (BGA) to attach the LED, which is a semiconductor device, to the substrate 112, but may fuse an electrode pattern of the semiconductor device onto the substrate 112 as it is. This may make it possible for the light source 111 including the LED 190 of the flip chip type to become smaller by omitting the metal lead (wire) or the ball grid array.

For example, the LED 190 may be a distributed Bragg reflector (DBR) LED including a DBR as shown in FIG. 6.

The LED 190 includes a transparent substrate 195, an n-type semiconductor layer (e.g., n-type gallium nitride (n-type GaN)) 193 and a p-type semiconductor layer (e.g., p-type GaN) 192. A multi quantum wells (MQW) layer 194 and an electron-blocking layer (EBL) 197 are formed between the n-type semiconductor layer 193 and the p-type semiconductor layer 192. When a current is applied to the LED 190, electrons and halls may be re-coupled in the MQW layer 194, thereby emitting light.

A first electrode 191a of the LED 190 electrically contacts the p-type semiconductor layer 192, and a second electrode 191b electrically contacts the n-type semiconductor layer 193. The first electrode 191a and the second electrode 191b may serve not only as electrodes but also as reflectors that reflect light.

A DBR layer 196 is arranged on the outer side of the transparent substrate 195. The DBR layer 196 may be formed by stacking up materials with different refractive indexes, and the DBR layer 196 may reflect incident light. As the DBR layer 196 is arranged on the outer side (upper side in the drawing) of the transparent substrate 195, light entering perpendicularly to the DBR layer 196 may be reflected by the DBR layer 196. Accordingly, the intensity of light emitted in a direction D1 perpendicular to the DBR layer 196 (in the upper direction of the LED in the drawing) is lower than the intensity of light emitted in a direction D2 slanted from the DBR layer 196 (e.g., a direction slanted from the upper direction in the drawing at about 60 degrees). In other words, the LED 190 may emit more intense light in a lateral direction than in the perpendicular direction.

The optical dome 180 may cover the LED 190. The optical dome 180 may prevent or suppress damage to the LED 190 due to an external mechanical action and/or chemical action.

The optical dome 180 may be shaped like, for example, a dome obtained by cutting a sphere without including the center or a semi-sphere obtained by cutting the sphere with the center included. A vertical cross-section of the optical dome 180 may have, e.g., an arcuate form or a semi-circular form.

The optical dome 180 may be formed of silicon or epoxy resin. For example, melted silicon or epoxy resin is discharged onto the LED 190 through, e.g., a nozzle, and then hardened to form the optical dome 180.

Accordingly, depending on viscosity of the fluid silicon or epoxy resin, the shape of the optical dome 180 may be variously changed. For example, when the optical dome 180 is manufactured with silicon with a thixotropic index of about 2.7 to 3.3 (e.g., 3.0), the optical dome 180 having a dome ratio of about 0.25 to 0.31 (e.g., 0.28) representing a ratio of dome height to a diameter of the bottom side of the dome (dome height/diameter of bottom side) may be formed. For example, the optical dome 180 manufactured with the silicon having the thixotropic index of about 2.7 to 3.3 (e.g., 3.0) may have a diameter of the bottom side of about 2.5 mm and height of about 0.7 mm.

The optical dome 180 may be optically transparent or translucent. Light emitted from the LED 190 may pass through the optical dome 180 to the outside.

In this case, the dome-shaped optical dome 180 may refract the light like a lens. For example, the light emitted from the LED 190 may be refracted and dispersed by the optical dome 180.

As such, the optical dome 180 may not only protect the LED 190 from an external mechanical action and/or chemical action or electrical action, but also diffuse the light emitted from the LED 190.

The substrate 112 may fix the plurality of light sources 111 to prevent the light sources 111 from being moved. In addition, the substrate 112 may supply power to each of the light sources 111 so that the light source 111 may emit light.

The substrate 112 may fix the plurality of light sources 111, and may be formed of a synthetic resin, tapered glass or a printed circuit board (PCB) with conductive power supply lines formed therein to supply power to the light sources 111.

The reflecting sheet 120 may reflect light emitted from the plurality of light sources 111 to a forward direction or to an approximate direction to the forward direction.

A plurality of through holes 120a are formed in the reflecting sheet 120 at positions corresponding to the plurality of light sources 111 of the light source module 110. Furthermore, the light sources 111 of the light source module 110 may pass the through holes 120a and protrude forward from the reflecting sheet 120. Accordingly, the plurality of light sources 111 may emit light from the front of the reflecting sheet 120. The reflecting sheet 120 may reflect the light emitted from the plurality of light sources 111 toward the reflecting sheet 120 toward the diffuser plate 130.

The diffuser plate 130 may be arranged in front of the light source module 110 and the reflecting sheet 120 to uniformly diffuse the light emitted from the light sources 111 of the light source module 110.

As described above, the plurality of light sources 111 are equi-distantly arranged on the rear surface of the light apparatus 100. This may cause different brightness depending on the locations of the plurality of light sources 111.

To eliminate the difference in brightness due to the plurality of light sources 111, the diffuser plate 130 may diffuse the light emitted from the plurality of light sources 111 within the diffuser plate 130. In other words, the diffuser plate 130 may uniformly emit non-uniform light forward from the plurality of light sources 111.

An optical sheet 140 may include various sheets to improve brightness and uniformity of the brightness. For example, the optical sheet 140 may include a diffuser sheet 141, a first prism sheet 142, a second prism sheet 143, a reflective polarizer sheet 144, etc. The optical sheet 140 is not limited to the sheets or films as illustrated in FIG. 4, and may further include various other sheets or films such as protective sheets.

Figure 7:
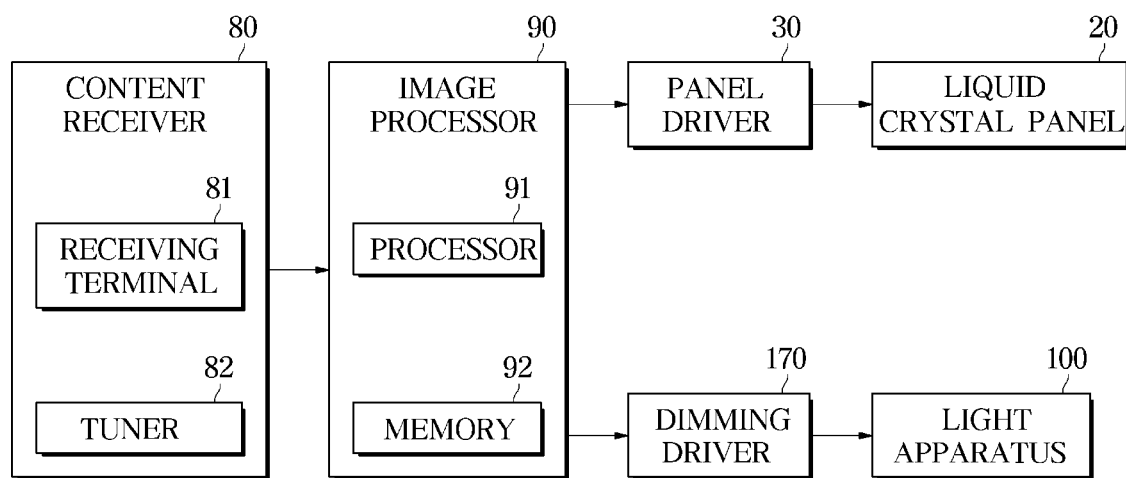
FIG. 7 is a block diagram of a display apparatus, according to an embodiment.
Figure 8:
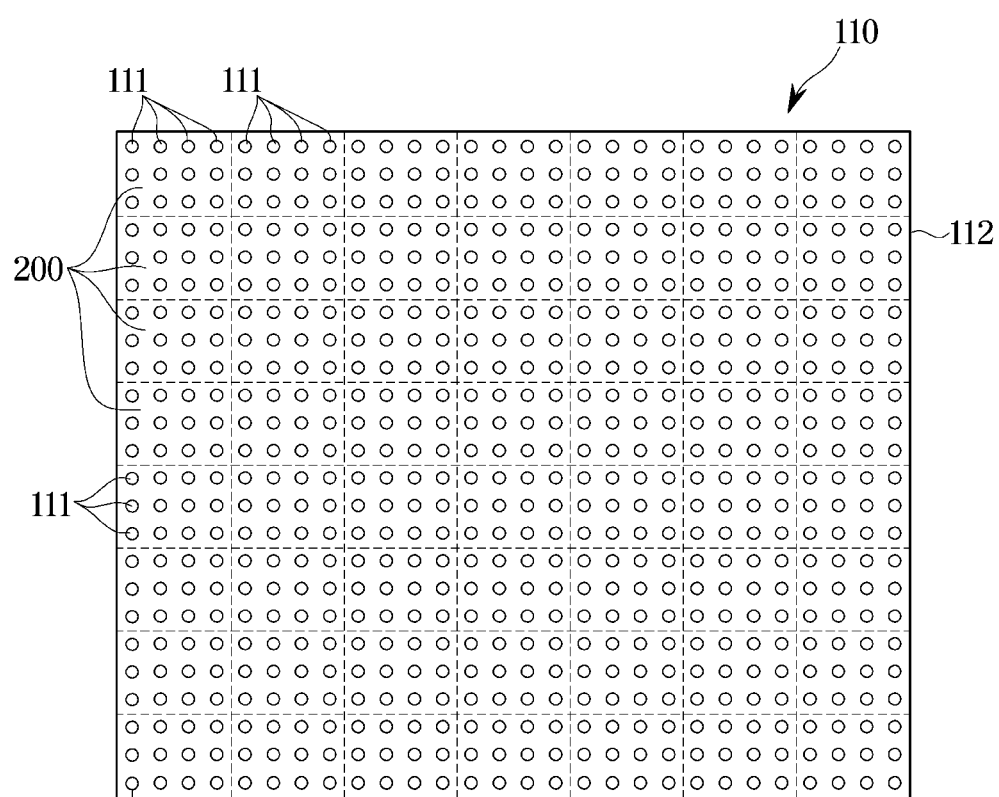
FIG. 8 is a plan view of dimming blocks of a light apparatus included in a display apparatus, according to an embodiment.
Figure 9:
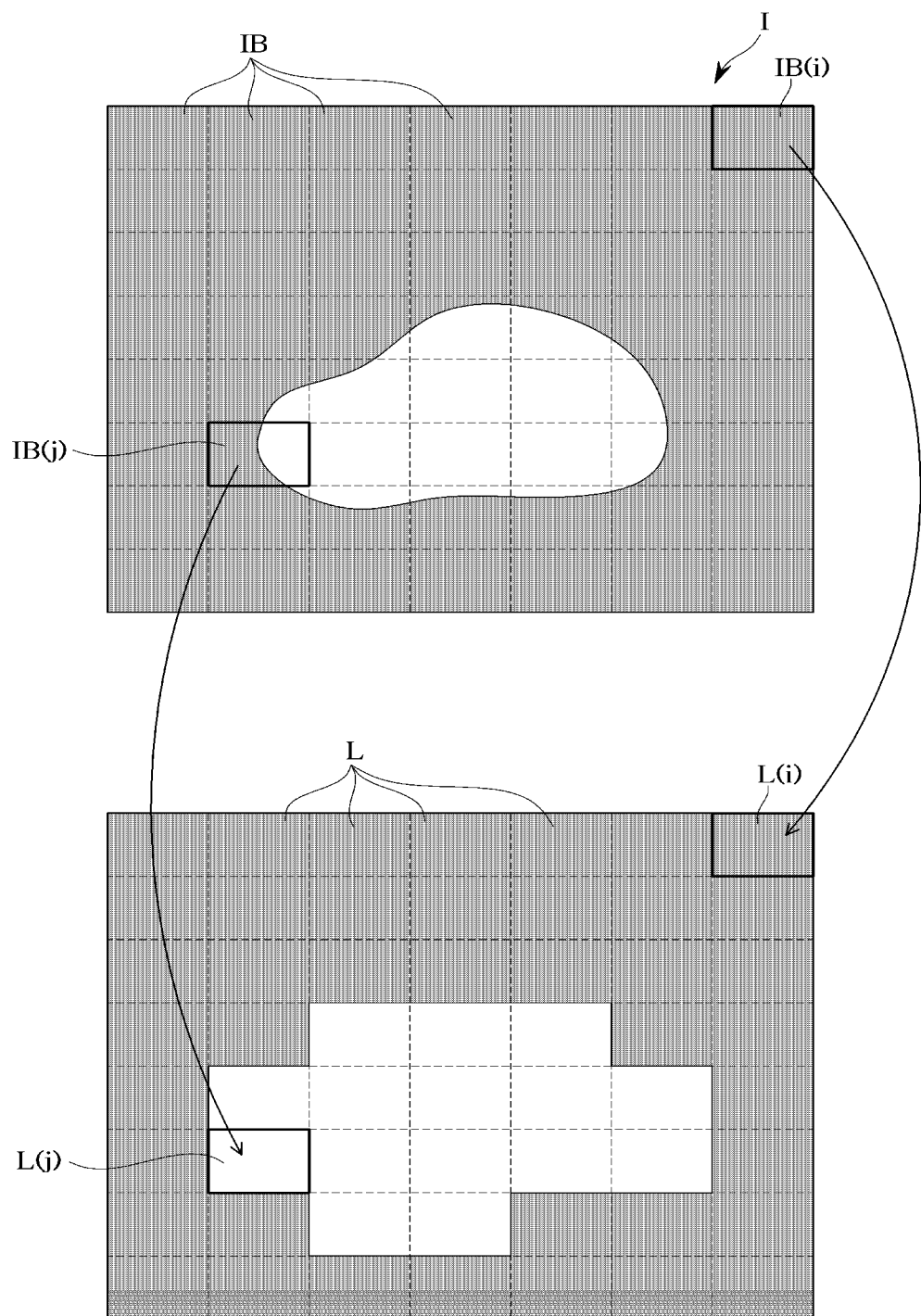
FIG. 9 is a diagram of an example in which a display apparatus converts image data to dimming data, according to an embodiment.

FIG. 7 is a block diagram of a display apparatus, according to an embodiment. FIG. 8 is a plan view of dimming blocks of a light apparatus included in a display apparatus, according to an embodiment. FIG. 9 is a diagram of an example in which a display apparatus converts image data to dimming data, according to an embodiment.

As shown in FIG. 7, the display apparatus 10 includes a content receiver 80, an image processor 90, a panel driver 30, a liquid crystal panel 20, a dimming driver 170, and a light apparatus 100.

The content receiver 80 may include receiving terminals 81 and a tuner 82 for receiving contents including video signals and/or audio signals from content sources.

The receiving terminals 81 may receive video signals and audio signals from the content sources through a cable. For example, the receiving terminals 81 may include a component (YPbPr/RGB) terminal, a composite video blanking and sync (CVBS) terminal, an audio terminal, a high definition multimedia interface (HDMI) terminal, a universal serial bus (USB) terminal, etc.

The tuner 82 may receive broadcast signals through a broadcast receiving antenna or a cable, and extract a broadcast signal on a channel selected by the user from among the received broadcast signals. For example, the tuner 82 may pass a broadcast signal having a frequency corresponding to a channel selected by the user among the plurality of broadcast signals received through the broadcast receiving antenna or the cable, and block the other broadcast signals having different frequencies.

As such, the content receiver 80 may receive video signals and audio signals from the content sources through the receiving terminals 81 and/or the tuner 82, and output the video signals and/or audio signals received through the receiving terminals 81 and/or the tuner 82 to the image processor 90.

The image processor 90 may include a processor 91 for processing image data and a memory 92 for memorizing/storing data.

The memory 92 may store a program and data for processing video signals and/or audio signals, and temporarily store data generated in the process of handling the video signals and/or audio signals.

The memory 92 may include a non-volatile memory, such as a Read Only Memory (ROM), a flash memory, and/or the like, and a volatile memory, such as a static random access memory (SRAM), a dynamic RAM (DRAM), or the like.

The processor 91 may receive video signals and/or audio signals from the content receiver 80, decode the video signal to image data, and generate dimming data from the image data. The image data and the dimming data may be output to the panel driver 30 and the dimming driver 170.

The display apparatus 10 may perform operations to improve a contrast ratio of an image.

As described above, the light apparatus 100 may include the plurality of light sources 111, and diffuse light emitted from the plurality of light sources 111 to output surface light. The liquid crystal panel 20 may include a plurality of pixels, and control the plurality of pixels each to pass or block light. Light that has passed the plurality of pixels may form an image.

In this case, the display apparatus 10 may turn off light sources of the light apparatus 100 corresponding to dark portions of the image to further darken the dark portions of the image. Accordingly, the contrast ratio of the image may be enhanced.

As such, the operation performed by the display apparatus 10 to control the light apparatus 100 not to emit light from portions corresponding to dark portions of the image is called "local dimming".

For local dimming, the plurality of light sources 111 included in the light source module 110 may be classified into a plurality of dimming blocks 200, as shown in FIG. 8. In FIG. 8, a total of 49 dimming blocks, which is 7×7 wide and long, are shown, but the number and arrangement of the dimming blocks is not limited to what is shown in FIG. 8.

Each of the plurality of dimming blocks 200 may include at least one light source 111. The light apparatus 100 may apply the same driving current to light sources belonging to the same dimming block, and the light sources belonging to the same dimming block may emit light with the same brightness.

Furthermore, the light apparatus 100 may apply different driving currents to light sources belonging to different dimming blocks depending on dimming data, and the light sources belonging to the different dimming blocks may emit light with different brightness.

The processor 91 may provide dimming data for local dimming to the light apparatus 100. The dimming data may include information about brightness of each of the plurality of dimming blocks 200. For example, the dimming data may include information regarding intensity of light output from light sources included in each of the plurality of dimming blocks 200.

The processor 91 may obtain dimming data from image data decoded from a video signal.

The processor 91 may convert image data to dimming data in various methods. For example, as shown in FIG. 9, the processor 91 may partition the image I from the image data into a plurality of image blocks IB. The number of the plurality of image blocks IB is the same as the number of the plurality of dimming blocks 200, and the plurality of image blocks IB may correspond to the plurality of dimming blocks 200, respectively.

The processor 91 may obtain brightness values L of the plurality of dimming blocks 200 from the image data of the plurality of image blocks IB. Furthermore, the processor 91 may generate dimming data by combining the brightness values L of the plurality of dimming blocks 200.

For example, the processor 91 may obtain the brightness value L of each of the plurality of dimming blocks 200 based on a maximum value of brightness values of pixels included in each image block IB.

An image block includes a plurality of pixels, and image data of an image block may include image data of the plurality of pixels (e.g., red data, green data, blue data, etc.).

The processor 91 may calculate a brightness value of each of the pixels based on image data of the pixel.

The processor 91 may determine a maximum value of brightness values of pixels included in an image block as a brightness value of a dimming block corresponding to the image block. For example, the processor 91 may determine a maximum value of brightness values of pixels included in an i-th image block IB(i) as a brightness value L(i) of an i-th dimming block, and determine a maximum value of brightness values of pixels included in an j-th image block IB(j) as a brightness value L(j) of an j-th dimming block.

The processor 91 may generate dimming data by combining the brightness values of the plurality of dimming blocks 200.

As such, the image processor 90 may decode a video signal obtained by the content receiver 80 into image data, and generate dimming data from the image data. Furthermore, the image processor 90 may transmit the image data and the dimming data to the liquid crystal panel 20 and the light apparatus 100, respectively.

The liquid crystal panel 20 includes a plurality of pixels capable of passing or blocking light, and the plurality of pixels are arranged in the form of a matrix. In other words, the plurality of pixels may be arranged in a plurality of rows and a plurality of columns.

The panel driver 30 may receive image data from the image processor 90, and drive the liquid crystal panel 20 according to the image data. The panel driver 30 may convert the image data, which is a digital signal, (hereinafter, referred to as digital image data) to an analog image signal, which is an analog voltage signal, and provide the analog image signal to the liquid crystal panel 20. According to the analog image signal, an optical property (e.g., light transmittance) of the plurality of pixels included in the liquid crystal panel 20 may be changed.

The panel driver 30 may include, for example, a timing controller, a data driver, a scan driver, etc.

The timing controller may receive image data from the image processor 90, and output the image data and a driving control signal to the data driver and the scan driver. The driving control signal may include a scan control signal and a data control signal, which may be used to control operations of the scan driver and the data driver, respectively.

The scan driver may receive the scan control signal from the timing controller, and in response to the scan control signal, input-activate one of the plurality of rows in the liquid crystal panel 20. In other words, the scan driver converts pixels included in a row among the plurality of pixels arranged in the plurality of rows and the plurality of columns into a state of being able to receive analog image signals. In this case, input-deactivated pixels other than the pixels input-activated by the scan driver are unable to receive analog image signals.

The data driver may receive image data and a data control signal from the timing controller, and output image data to the liquid crystal panel 20 according to the data control signal. For example, the data driver may receive digital image data from the timing controller, and convert the digital image data to an analog image signal. Furthermore, the data driver may provide the analog image signal to pixels included in a row input-activated by the scan driver. In this case, the pixels input-activated by the scan driver receive the analog image signal, which makes an optical property (e.g., light transmittance) of the input-activated pixels changed.

As such, the panel driver 30 may drive the liquid crystal panel 20 according to the image data. Accordingly, an image corresponding to the image data may be displayed on the liquid crystal panel 20.

The light apparatus 100 includes the plurality of light sources 111 that emit light, and the plurality of light sources 111 are arranged in the form of a matrix. In other words, the plurality of light sources 111 may be arranged in a plurality of rows and a plurality of columns. Furthermore, the light apparatus 100 may be divided into the plurality of dimming blocks 200, each of which may include at least one light source.

The dimming driver 170 may receive dimming data from the image processor 90, and drive the light apparatus 100 according to the dimming data. The dimming data may include information about brightness of each of the plurality of dimming blocks 200, or information about brightness of light sources included in each of the plurality of dimming blocks 200.

The dimming driver 170 may convert dimming data, which is a digital signal, (hereinafter, referred to as digital dimming data) to an analog dimming signal, which is an analog voltage signal, and provide the analog dimming signal to the light apparatus 100. Depending on the analog dimming signal, intensity of light emitted by light sources included in each of the plurality of dimming blocks 200 may be changed.

The dimming driver 170 may not directly provide the analog dimming signal to all of the plurality of dimming blocks 200, but may sequentially provide the analog dimming signal to the plurality of dimming blocks 200 in an active matrix scheme.

As described above, the plurality of dimming blocks 200 may be arranged in the light apparatus 100 in the form of a matrix. In other words, the plurality of dimming blocks 200 may be arranged in a plurality of rows and a plurality of columns in the light apparatus 100.

The dimming driver 170 may sequentially provide the analog dimming signal to the dimming blocks belonging to each of the plurality of rows, or sequentially provide the analog dimming signal to dimming blocks belonging to each of the plurality of columns.

For example, the dimming driver 170 may input-activate dimming blocks belonging to a row among the plurality of dimming blocks 200, and provide the analog dimming signal to the input-activated dimming blocks. Subsequently, the dimming driver 170 may input-activate dimming blocks belonging to a row among the plurality of dimming blocks, and provide the analog dimming signal to the input-activated dimming blocks.

The dimming driver 170 sequentially providing the analog dimming signal to the plurality of dimming blocks 200 in an active matrix scheme will now be described in detail.

Figure 10:
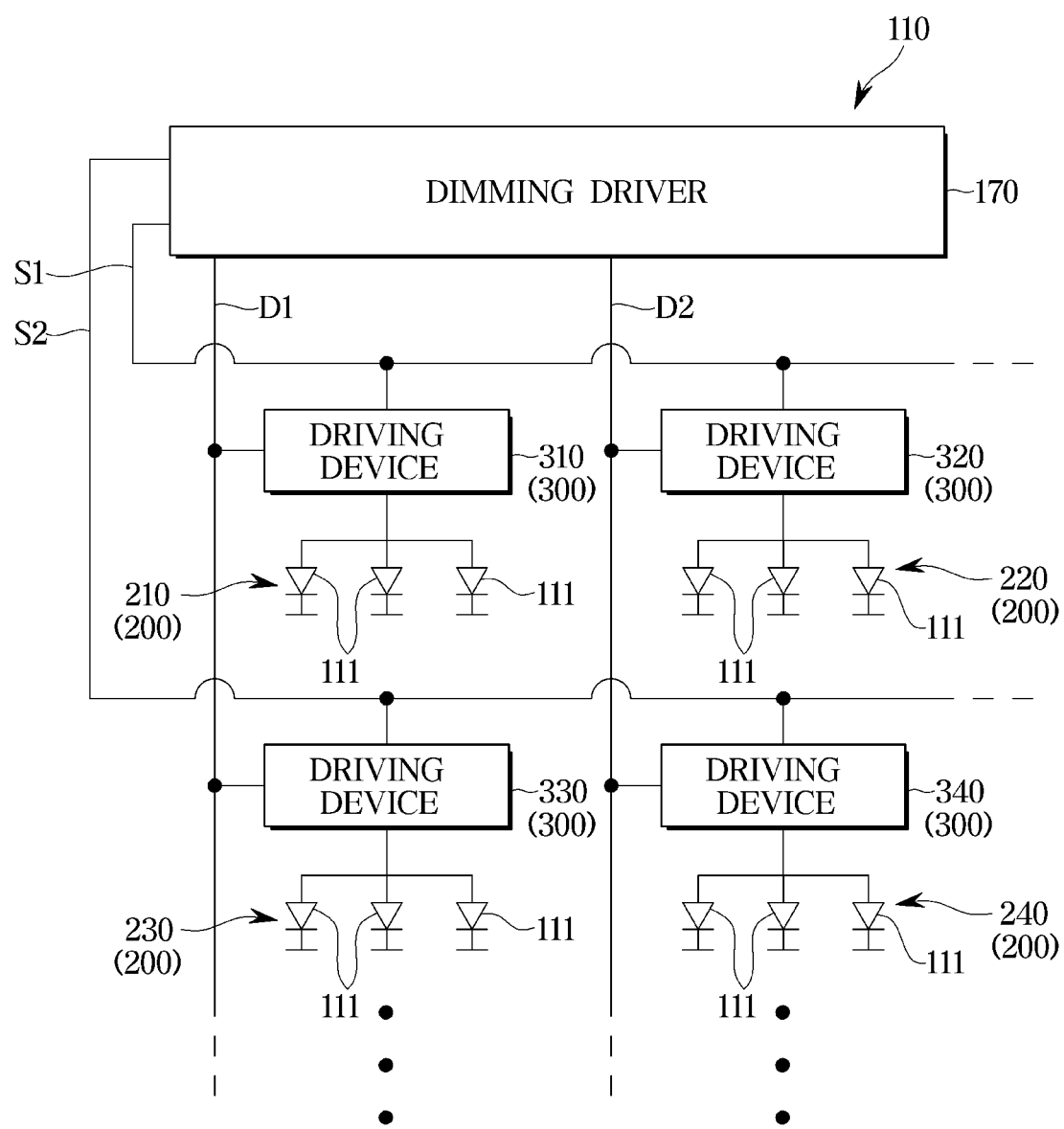
FIG. 10 is a circuit block diagram of a dimming driver and a light apparatus included in a display apparatus, according to an embodiment.
Figure 11:
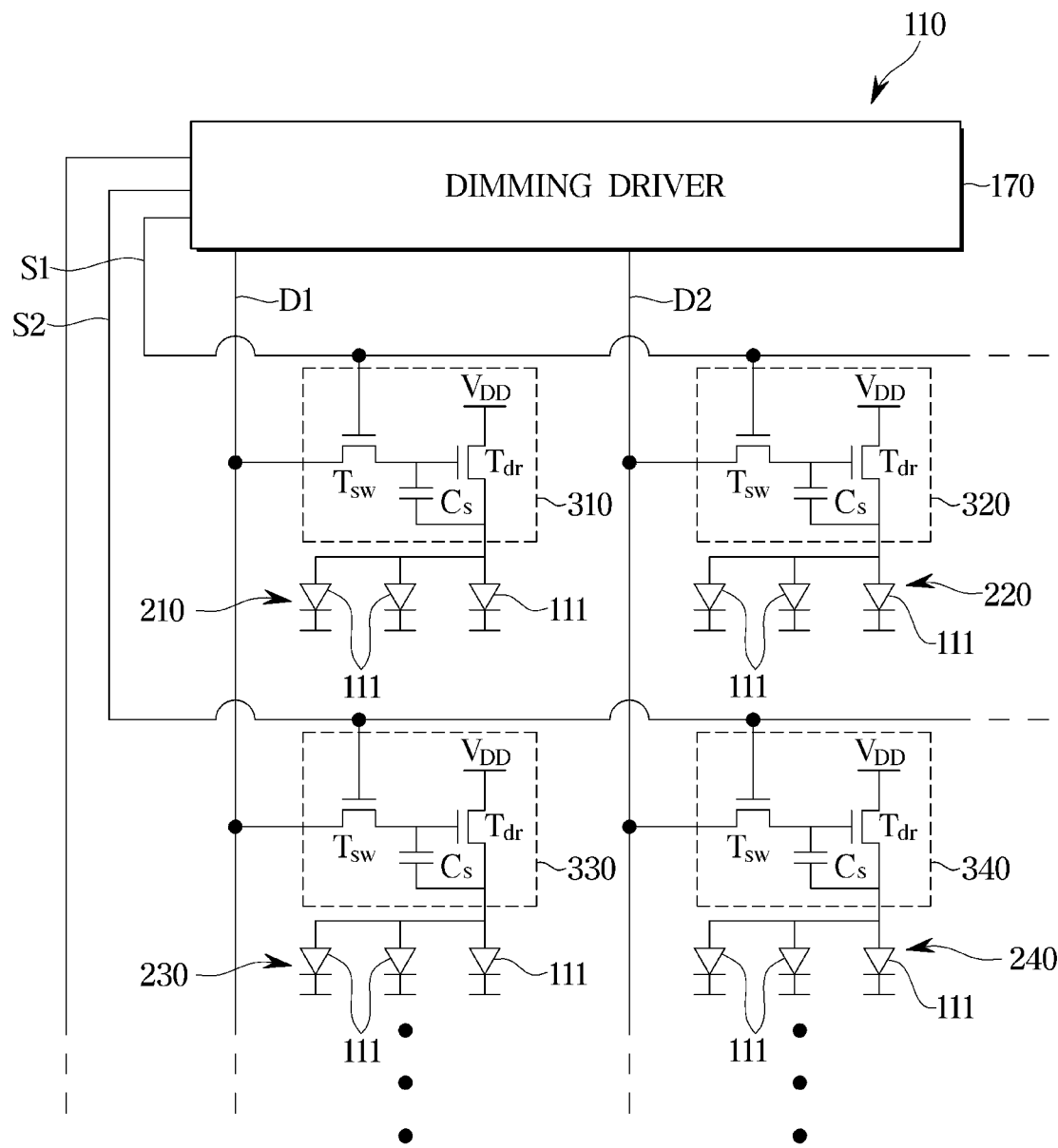
FIG. 11 is a circuit block diagram of a driving device included in a display apparatus, according to an embodiment.

FIG. 10 is a circuit block diagram of a dimming driver and a light apparatus included in a display apparatus, according to an embodiment. FIG. 11 is a circuit block diagram of a driving device included in a display apparatus, according to an embodiment.

Referring to FIGS. 10 and 11, the display apparatus 10 includes the dimming driver 170, a plurality of driving devices 310, 320, 330, and 340, collectively 300, and the plurality of light sources 111.

The plurality of light sources may each include an LED, and may be classified into a plurality of dimming blocks 200. A plurality of light sources belonging to the same dimming block may form a group.

The plurality of driving devices 300 may receive an analog dimming signal from the dimming driver 170, and may apply a driving current to the plurality of light sources 111 according to the received analog dimming signal.

As shown in FIG. 10, a plurality of light sources belonging to a dimming block may receive a current from the same driving device. For example, a plurality of light sources belonging to a first dimming block 210 may receive a driving current from the first driving device 310. A plurality of light sources belonging to a second dimming block 220 may receive a driving current from the second driving device 320. A plurality of light sources belonging to a third dimming block 230 may receive a driving current from the third driving device 330. A plurality of light sources belonging to a fourth dimming block 240 may receive a driving current from the fourth driving device 340. In this way, a plurality of light sources belonging to an n-th dimming block may receive a driving current from an n-th driving device.

Accordingly, a plurality of light sources belonging to a dimming block may receive the driving current with the same magnitude. Furthermore, a plurality of light sources belonging to a dimming block may emit light with the same intensity.

The driving devices 300 may receive the analog dimming signal from the dimming driver 170 and store the received analog dimming signal while being input-activated by the dimming driver 170. Furthermore, while being input-activated, the plurality of driving devices 300 may apply a driving current corresponding to the stored analog dimming signal to the plurality of light sources.

There are a plurality of scan lines S1 and S2 for providing scan signals to the plurality of driving devices 300 from the dimming driver 170, and a plurality of data lines D1 and D2 for providing analog dimming signals to the plurality of driving devices 300 from the dimming driver 170.

The plurality of dimming blocks 200 may be arranged in a plurality of rows and a plurality of columns. Driving devices that apply the driving current to light sources of dimming blocks belonging to the same row may share the same scan line. For example, the first driving device 310 and the second driving device 320 may share the first scan line S1, and the third driving device 330 and the fourth driving device 340 may share the second scan line S2.

Furthermore, driving devices that apply the driving current to light sources of dimming blocks belonging to the same column may share the same data line. For example, the first driving device 310 and the third driving device 330 may share the first data line D1, and the second driving device 320 and the fourth driving device 340 may share the second data line D2.

The plurality of driving devices 300 may be input-activated by scan signals of the dimming driver 170, and may receive the analog dimming signal from the dimming driver 170.

For example, while the dimming driver 170 is outputting a scan signal through the first scan line S1, the first driving device 310 and the second driving device 320 may receive analog dimming signals through the first data line D1 and the second data line D2, respectively. On the other hand, the third driving device 330 and the fourth driving device 340 are not able to receive the analog dimming signal.

Furthermore, while the dimming driver 170 is outputting a scan signal through the second scan line S2, the third driving device 330 and the fourth driving device 340 may receive analog dimming signals through the first data line D1 and the second data line D2, respectively. On the other hand, the first driving device 310 and the second driving device 320 are not able to receive the analog dimming signal.

On receiving the analog dimming signal, the plurality of driving devices 300 may store the received analog dimming signal, and may apply a driving current to the plurality of light sources according to the stored analog dimming signal.

For example, even while the dimming driver 170 is outputting a scan signal through the first scan line S1, the third driving device 330 and the fourth driving device 340 may apply driving currents to the plurality of light sources included in the third and fourth dimming blocks 230 and 240.

Furthermore, even while the dimming driver 170 is outputting a scan signal through the second scan line S2, the first driving device 310 and the second driving device 320 may apply driving currents to the plurality of light sources included in the first and second dimming blocks 210 and 220.

According to this active matrix scheme based operation, the plurality of driving devices 300 may sequentially receive analog dimming signals from the dimming driver 170, and may apply a driving current to a plurality of light sources even while in an input-deactivated state in which no analog dimming signal is received from the dimming driver 170.

Furthermore, according to the active matrix scheme based operation, the number of pins of the dimming driver 170 to provide analog dimming signals to the plurality of dimming blocks 200 is reduced. Moreover, the number of signal lines to provide analog dimming signals to the plurality of dimming blocks 200 from the dimming driver 170 is reduced. Accordingly, the number of dimming blocks may increase without limit to the number of pins of the dimming driver 170.

The plurality of driving devices 300 may include various topology circuits to perform the active matrix scheme based operation.

For example, as shown in FIG. 11, each of the plurality of driving devices 300 may include a one-capacitor two-transistor (1C2T) topology circuit.

Each of the plurality of driving devices 300 may include a driving transistor Tdr, a switching transistor Tsw, and a storage capacitor Cs.

The driving transistor Tdr includes an input terminal, an output terminal, and a control terminal. The input terminal of the driving transistor Tdr may be connected to a power source Vdd, and the output terminal may be connected to a plurality of light sources. The driving transistor Tdr may apply a driving current to the plurality of light sources based on a voltage at the control terminal.

The storage capacitor Cs is provided between the output terminal and the control terminal of the driving transistor Tdr. The storage capacitor Cs may output a constant voltage by storing input charges. The driving transistor Tdr may apply a driving current to the plurality of light sources based on a voltage output by the storage capacitor Cs.

The switching transistor Tsw also includes an input terminal, an output terminal, and a control terminal. The input terminal of the switching transistor Tsw may be connected to the data line D1 or D2, and the output terminal of the switching transistor Tsw may be connected to the control terminal of the driving transistor Tdr. The control terminal of the switching transistor Tsw may be connected to the scan line S1 or S2.

The switching transistor Tsw may be turned on by a scan signal of the scan line S1 or S2, and may deliver an analog dimming signal of the data line D1 or D2 to the storage capacitor Cs and the driving transistor Tdr. The analog dimming signal of the data line D1 or D2 is input to the control terminal of the driving transistor Tdr, and the driving transistor Tdr may apply a driving current corresponding to the analog dimming signal to the plurality of light sources. The storage capacitor Cs may store charges from the analog dimming signal, and output a voltage corresponding to the analog dimming signal.

After this, even when the inputting of the scan signal is stopped and the switching transistor Tsw is turned off, the storage capacitor Cs may still output the voltage corresponding to the analog dimming signal, and the driving transistor Tdr may still apply the driving current corresponding to the analog dimming signal to the plurality of light sources.

A circuit as shown in FIG. 11 is an example of the driving device 300, without being limited thereto. For example, the driving device 300 may include a 3T1C topology circuit obtained by adding a transistor to compensate for body effect of the driving transistor Tdr.

The driving device 300 may be provided, for example, in a single chip in which the circuit shown in FIG. 11 is integrated. In other words, the circuit shown in FIG. 11 may be integrated in a single semiconductor chip.

Figure 12:
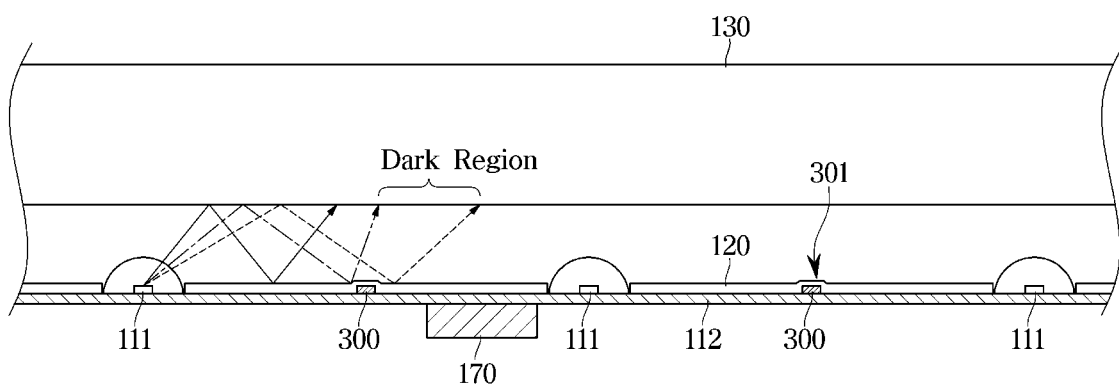
FIG. 12 is a cross-sectional view of a dimming driver, driving devices and light sources included in a display apparatus, according to an embodiment.

FIG. 12 is a cross-sectional view of a dimming driver, driving devices and light sources included in a display apparatus, according to an embodiment.

As described above, the plurality of light sources 111 are arranged on the substrate 112. The plurality of light sources 111 are arranged on the front surface (a surface from which a light source module emits light) of the substrate 112.

For efficient wiring, the dimming driver 170 may be arranged on the rear surface (a surface from which the light source module does not emit light, or an opposite surface of the surface from which the light source module emits light) of the substrate 112. Turning back to FIG. 2, the substrate 112 on which the driving devices 300, the plurality of light sources 111 and the dimming driver 170 are mounted may be supported by the bottom chassis 15. The bottom chassis 15 may also support the control assembly 50 and the power assembly 60. The substrate 112 may be arranged on the front surface of the bottom chassis 15, and the control assembly 50 may be arranged on the rear surface of the bottom chassis 15.

The dimming driver 170 may receive dimming data from the image processor 90 included in the control assembly 50, and receive power from the power assembly 60. Accordingly, for efficient wiring, the dimming driver 170 may be arranged on the rear surface of the substrate 112, and may be connected to the control assembly 50 and the power assembly 60 through a wire passing through the opening 15a formed at the bottom chassis 15.

The dimming driver 170 arranged on the rear surface of the substrate 112 is arranged at a position corresponding to the location of the opening 15a. This may prevent the light apparatus 100 from growing thicker due to the dimming driver 170 arranged on the rear surface of the substrate 112.

To minimize the thickness of the light apparatus 100, the driving device 300 may be arranged on the same surface (front surface) as the plurality of light sources 111, as shown in FIG. 12. Thickness of the light source module 110 when the driving device 300 is mounted on the same surface as the plurality of light sources 111 is thinner than thickness of the light source module 110 when the driving device 300 is mounted on the different surface from the plurality of light sources 111.

As such, when the driving device 300 is arranged on the same surface (front surface) as the plurality of light sources 111, there may be an optical defect due to the driving device 300.

As shown in FIG. 12, the reflecting sheet 120 is arranged on the substrate 112. To secure an optical distance between the reflecting sheet 120 and the diffuser plate 130, the reflecting sheet 120 may be tightly adhered to the substrate 112. Accordingly, a concave part 301 of the reflecting sheet 120 may be formed at where the driving device 300 is arranged.

The concave part 301 on the reflecting sheet 120 may cause an optical defect in the light apparatus 100. As an example, as shown in FIG. 12, part of the light emitted from a light source may reflect from the surface of the diffuser plate 130. The light reflecting from the surface of the diffuser plate 130 may reflect again from the reflecting sheet 120. In this case, the concave part 301 of the reflecting sheet 120 may make a region in which the light having reflected from the surface of the diffuser plate 130 does not arrive (or a region in which light of weak intensity arrives, which will be hereinafter referred to as a dark region).

When there are sporadic dark regions, diffusion of light on the diffuser plate 130 and the optical sheet 140 may prevent the dark region from being displayed on the screen 12 of the display apparatus 10. However, when there are regular dark regions, the dark region may be displayed on the screen 12 of the display apparatus 10.

The driving device 300 is arranged so that the dark region from the arrangement of the driving device 300 is not displayed on the screen 12 of the display apparatus 10.

Figure 13:
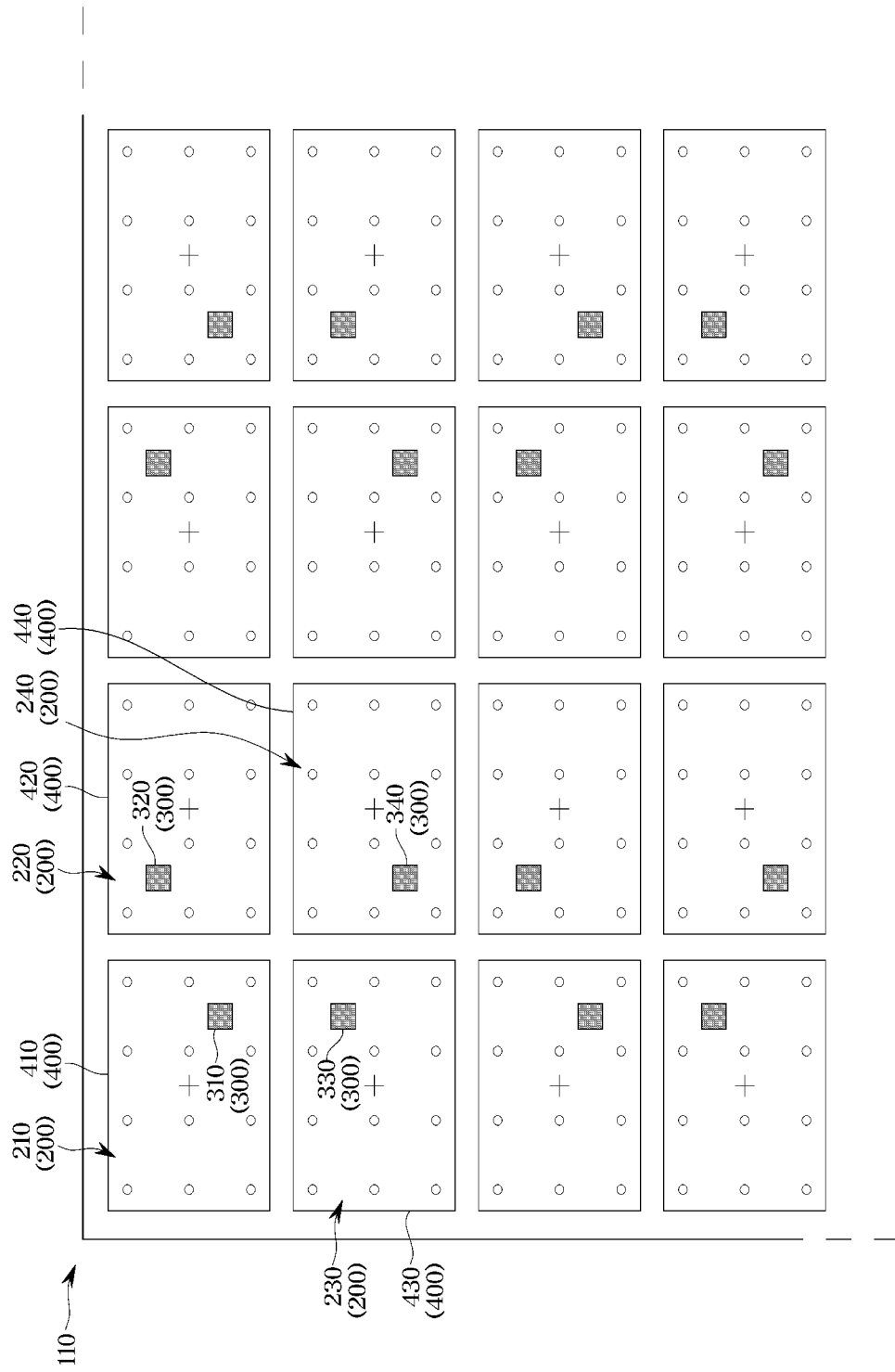
FIG. 13 is a plan view of driving devices included in a display apparatus, according to an embodiment.

FIG. 13 shows an example of arrangement of driving devices included in a display apparatus, according to an embodiment.

Referring to FIG. 13, the light source module 110 includes the plurality of light sources 111, which are arranged on the substrate 112 in the form of a matrix.

In this case, the plurality of light sources 111 may be classified into the plurality of dimming blocks 200. In other words, the front surface (the surface from which light is emitted) of the light source module 110 may be partitioned by the plurality of dimming blocks 200 into a plurality of dimming areas 400.

Furthermore, the light source module 110 may further include the plurality of driving devices 300 for applying driving currents to light sources, and each of the plurality of driving devices 300 may apply a driving current to light sources included in a dimming block. Each of the driving devices 300 is located in a dimming area of a dimming block.

To prevent or suppress an optical defect due to arrangement of the driving devices 300, the driving devices 300 may be irregularly arranged in the dimming areas. Relative positions of the driving devices in the different dimming blocks may be different from one another.

For example, as shown in FIG. 13, the front surface (a surface from which light is emitted) of the light source module 110 is partitioned into a first dimming area 410 corresponding to the first dimming block 210, a second dimming area 420 corresponding to the second dimming block 220, a third dimming area 430 corresponding to the third dimming block 230, and a fourth dimming area 440 corresponding to the fourth dimming block 240.

In each dimming area 400, a driving device for applying a driving current to a plurality of light sources (twelve light sources as shown in FIG. 13) is located. In the first dimming area 410, the first driving device 310 may be arranged to apply a driving current to light sources belonging to the first dimming block 210. In the same manner, in the second, third, and fourth dimming areas 420, 430 and 440, the second, third, and fourth driving devices 320, 330, and 340 may be arranged to apply driving currents to light sources belonging to the second, third, and fourth dimming blocks 420, 430, and 440.

The first driving device 310 is arranged in a lower right portion from the center of the first dimming area 410, and the second driving device 320 is arranged in an upper left portion from the center of the second dimming area 420. Furthermore, the third driving device 330 is arranged in an upper right portion from the center of the third dimming area 430, and the fourth driving device 340 is arranged in a lower left portion from the center of the fourth dimming area 440.

Arrangement of the first driving device 310 in the first dimming area 410 is different from arrangement of the second and third driving devices 320 and 330 in the second and third dimming areas 420 and 430 adjacent to the first dimming area 410. Furthermore, arrangement of the second driving device 320 in the second dimming area 420 is different from arrangement of driving devices in the adjacent dimming areas to the second dimming area 420.

As such, arrangement of a driving device in a dimming area is different from arrangement of driving devices in other dimming areas adjacent to the former dimming area. Here, different arrangement represents that a relative location of a driving device from the center of a dimming area is different.

The first dimming area 410, the second dimming area 420, the third dimming area 430, and the fourth dimming area 440 are arranged in a plurality of rows and a plurality of columns.

Arrangement of the first driving device 310 in the first dimming area 410 is different from arrangement of the second driving device 320 in the second dimming area 420 belonging to the same column as the first dimming area 410 and adjacent to the first dimming area 410. Furthermore, arrangement of the first driving device 310 in the first dimming area 410 is different from arrangement of the third driving device 330 in the third dimming area 430 belonging to the same row as the first dimming area 410 and adjacent to the first dimming area 410.

As such, arrangement of a driving device in one of a plurality of dimming areas arranged in a plurality of rows and a plurality of columns is different from arrangement of a driving device in another dimming area belonging to the same row or column as the one dimming area and adjacent to the one dimming area.

Furthermore, a driving device in one of a plurality of dimming areas arranged in a plurality of rows and a plurality of columns is arranged out of (i.e., outside) a virtual line defined by two driving devices in two dimming areas belonging to the same row as the one dimming area and adjacent to the one dimming area.

The first driving device 310 in the first dimming area 410 in the first row and first column is arranged on the right from the center of the dimming area, and the second driving device 320 in the second dimming area 420 in the first row and second column is arranged on the left from the center of the dimming area.

As such, driving devices in a plurality dimming areas arranged in the same row are arranged alternately on the left and right from the center of the dimming area.

The first driving device 310 in the first dimming area 410 in the first row and first column is arranged in a lower portion from the center of the dimming area, and the third driving device 330 in the third dimming area 430 in the second row and first column is arranged in an upper portion from the center of the dimming area.

As such, driving devices in a plurality dimming areas arranged in the same column are arranged alternately above and below the center of the dimming area.

The first driving device 310 is arranged closest to the second driving device 320 and the third driving device 330, and the first to third driving devices 310, 320, and 330 are not arranged in a straight line. In other words, the first driving device 310 is arranged out of (i.e., outside) a virtual line that connects the second driving device 320 and the third driving device 330 closest to the first driving device 310.

As such, one of the plurality of driving devices is arranged out of a virtual line defined by two driving devices closest to the one driving device.

As described above, the plurality of driving devices may be arranged irregularly or in arbitrary positions in the plurality of dimming areas.

Figure 14:
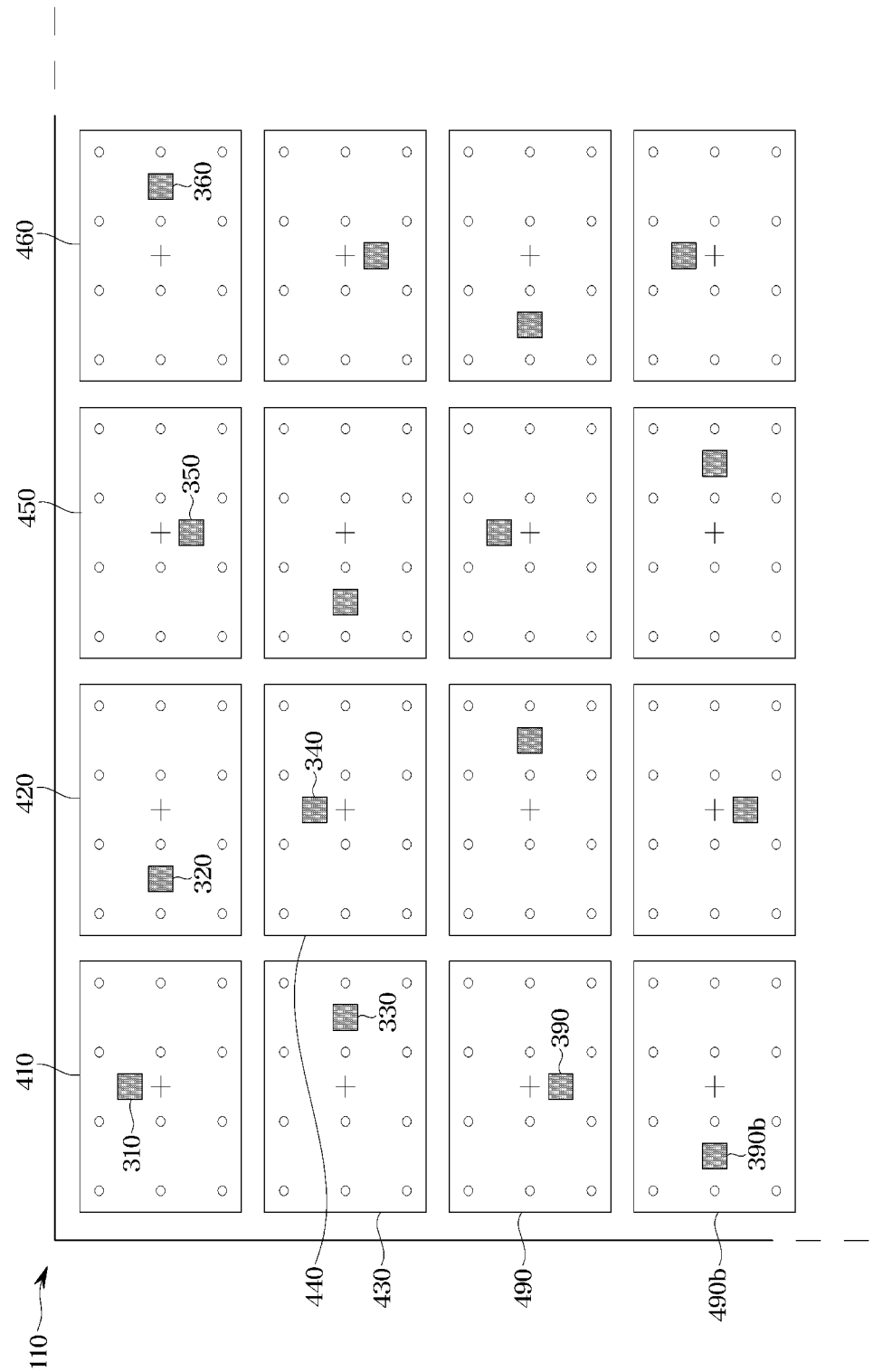
FIG. 14 is a plan view of driving devices included in a display apparatus, according to an embodiment.

FIG. 14 is a plan view of driving devices included in a display apparatus, according to an embodiment.

As shown in FIG. 14, driving devices of four neighboring dimming areas in the same row may be arranged in different positions with respect to the center of the dimming areas.

The first, second, fifth and sixth dimming areas 410, 420, 450, and 460 may be arranged in the same row. The first driving device 310 may be located above the center of the first dimming area 410, the second driving device 320 may be located on the left from the center of the second dimming area 420, the fifth driving device 350 may be located below the center of the fifth dimming area 450, and the sixth driving device 360 may be located on the right from the center of the sixth dimming area 460.

Driving devices of four neighboring dimming areas in the same column may be arranged in different positions with respect to the center of the dimming areas.

The first, third, ninth and eleventh dimming areas 410, 430, 490, and 490b may be arranged in the same column. The first driving device 310 may be located above the center of the first dimming area 410, the third driving device 330 may be located on the right from the center of the third dimming area 430, the ninth driving device 390 may be located below the center of the ninth dimming area 490, and the eleventh driving device 390b may be located on the left from the center of the eleventh dimming area 490b.

As such, arrangement of a driving device in a dimming area is different from arrangement of driving devices in other dimming areas adjacent to the former dimming area.

Arrangement of a driving device in one of a plurality of dimming areas arranged in a plurality of rows and a plurality of columns is different from arrangement of a driving device in another dimming area belonging to the same row or column as the one dimming area and adjacent to the one dimming area.

One of the plurality of driving devices is arranged out of (i.e., outside) a virtual line defined by two driving devices closest to the one driving device.

Figure 15:
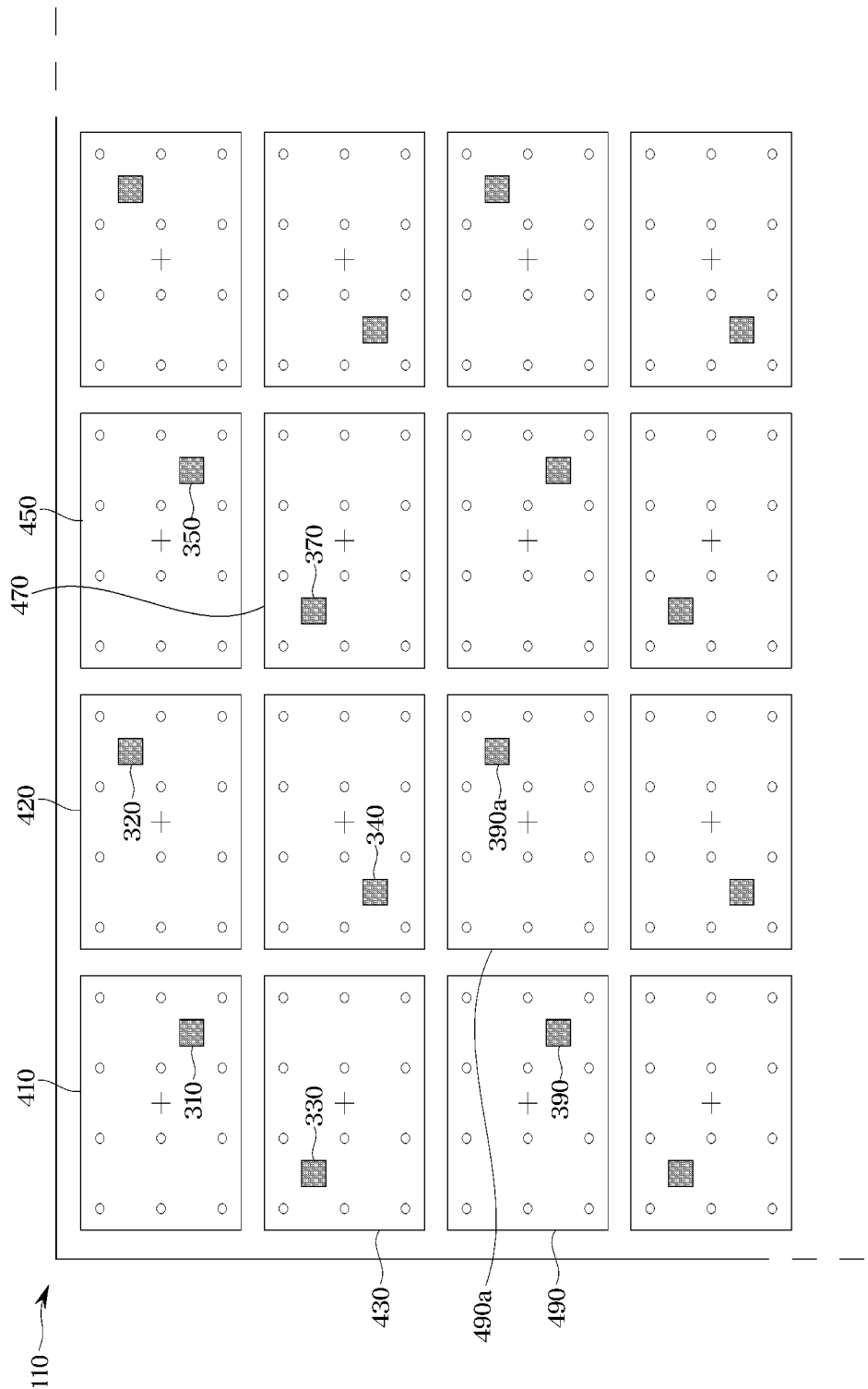
FIG. 15 is a plan view of driving devices included in a display apparatus, according to an embodiment.

FIG. 15 is a plan view of driving devices included in a display apparatus, according to an embodiment.

As shown in FIG. 15, driving devices of four neighboring dimming areas may be arranged in different positions with respect to the center of the dimming areas.

The first, second, third and fourth dimming areas 410, 420, 430, and 440 may be arranged to be adjacent to one another. The first driving device 310 may be located in a lower right portion from the center of the first dimming area 410, the second driving device 320 may be located in an upper right portion from the center of the second dimming area 420, the third driving device 330 may be located in an upper left portion from the center of the third dimming area 430, and the fourth driving device 340 may be located in a lower left portion from the center of the fourth dimming area 440.

The second, fourth, fifth and seventh dimming areas 420, 440, 450, and 470 may be arranged to be adjacent to one another. The second driving device 320 may be located in an upper right portion from the center of the second dimming area 420, the fourth driving device 340 may be located in a lower left portion from the center of the fourth dimming area 440, the fifth driving device 350 may be located in a lower right portion from the center of the fifth dimming area 450, and the seventh driving device 370 may be located in an upper left portion from the center of the seventh dimming area 470.

The third, fourth, ninth and tenth dimming areas 430, 440, 490, and 490a may be arranged to be adjacent to one another. The third driving device 330 may be located in an upper left portion from the center of the third dimming area 430, the fourth driving device 340 may be located in a lower left portion from the center of the fourth dimming area 440, the ninth driving device 390 may be located in a lower right portion from the center of the ninth dimming area 490, and the tenth driving device 390a may be located in an upper right portion from the center of the tenth dimming area 490a.

As such, arrangement of a driving device in a dimming area is different from arrangement of driving devices in other dimming areas adjacent to the former dimming area.

Arrangement of a driving device in one of a plurality of dimming areas arranged in a plurality of rows and a plurality of columns is different from arrangement of a driving device in another dimming area belonging to the same row or column as the one dimming area and adjacent to the one dimming area.

One of the plurality of driving devices is arranged out of (i.e., outside) a virtual line defined by two driving devices closest to the one driving device.

With this arrangement of the driving devices 300, an optical defect due to the driving devices 300 may be prevented or suppressed.

Although it is described above that a driving device applies a driving current to light sources belonging to a dimming block, it is not limited thereto. For example, a driving device may apply a driving current to light sources belonging to a plurality of dimming blocks.

Figure 16:
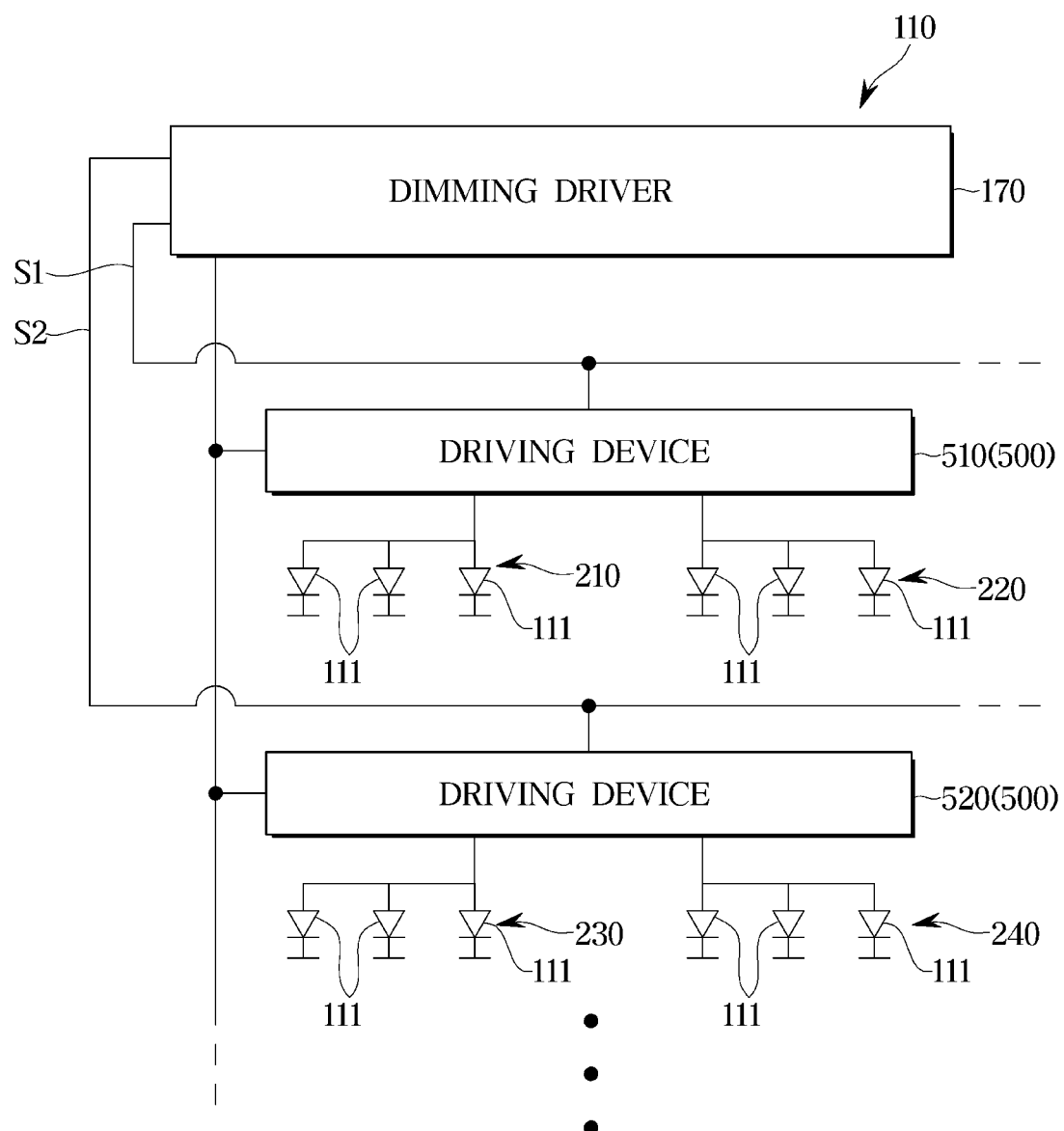
FIG. 16 is a circuit block diagram of a dimming driver and a light apparatus included in a display apparatus, according to an embodiment.
Figure 17:
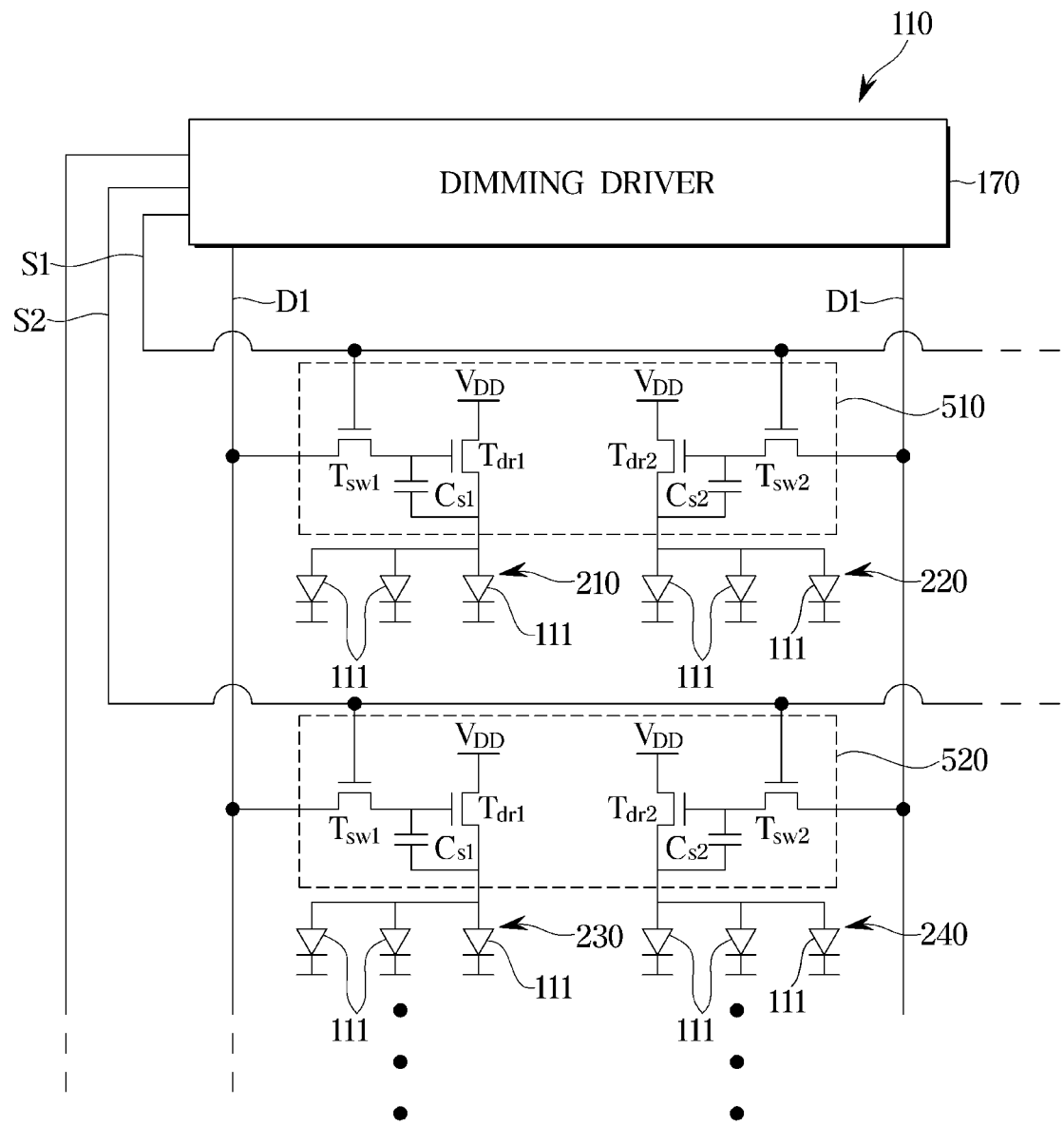
FIG. 17 is a circuit block diagram of a driving device included in a display apparatus, according to an embodiment.

FIG. 16 is a circuit block diagram of a dimming driver and a light apparatus included in a display apparatus, according to an embodiment. FIG. 17 is a circuit block diagram of a driving device included in a display apparatus, according to an embodiment.

Referring to FIGS. 16 and 17, the display apparatus 10 includes the dimming driver 170, a plurality of driving devices 500 (510 and 520), and the plurality of light sources 111.

The plurality of light sources 111 may be the same as the plurality of light sources shown in FIG. 10.

The plurality of driving devices 500 may receive an analog dimming signal from the dimming driver 170, and may apply a driving current to the plurality of light sources 111 according to the received analog dimming signal.

According to what is shown in FIG. 16, each the driving devices 500 may apply a driving current to light sources included in a plurality of dimming blocks 200. For example, the first driving device 510 may apply a driving current to a plurality of light sources belonging to the first dimming block 210 and a plurality of light sources belonging to the second dimming block 220. The second driving device 520 may apply a driving current to a plurality of light sources belonging to the third dimming block 230 and a plurality of light sources belonging to the fourth dimming block 240. In the same manner, the n-th driving device may apply a driving current to a plurality of light sources belonging to a (2n–1)-th dimming block and a plurality of light sources belonging to a 2n-th dimming block.

In this case, the driving devices 500 may apply different driving currents to light sources belonging to different dimming blocks based on analog dimming signals. For example, the first driving device 310 may apply a first driving current to light sources belonging to the first dimming block 210 according to an analog dimming signal, and apply a second driving current to light sources belonging to the second dimming block 220 according to an analog dimming signal.

While input-activated by the dimming driver 170, the plurality of driving devices 500 may receive analog dimming signal from the dimming driver 170 and store the received analog dimming signals. Furthermore, while being input-activated, the plurality of driving devices 500 may apply a driving current corresponding to the stored analog dimming signal to the plurality of light sources.

The plurality of driving devices 500 may be input-activated by scan signals of the dimming driver 170, and may receive the analog dimming signal from the dimming driver 170. On receiving the analog dimming signal, the plurality of driving devices 500 may store the received analog dimming signal, and may apply a driving current to the plurality of light sources according to the stored analog dimming signal.

For example, while the dimming driver 170 is outputting a scan signal through the first scan line S1, the first driving device 510 may receive an analog dimming signal through the first data line D1. The first driving device 510 may apply a driving current to light sources of the first dimming block 210 and light sources of the second dimming block 220 according to the received analog dimming signal. The second driving device 520 may not receive an analog dimming signal, but may still apply a driving current to light sources of the third dimming block 230 and light sources of the fourth dimming block 240.

Furthermore, while the dimming driver 170 is outputting a scan signal through the second scan line S2, the second driving device 520 may receive an analog dimming signal through the first data line D1. The second driving device 520 may apply a driving current to light sources of the third dimming block 230 and light sources of the fourth dimming block 240 according to the received analog dimming signal. The second driving device 520 may not receive an analog dimming signal, but may still apply a driving current to light sources of the first dimming block 210 and light sources of the second dimming block 220.

According to this active matrix scheme based operation, the number of pins of the dimming driver 170 to provide analog dimming signals to the plurality of dimming blocks 200 is reduced.

Further, the number of driving devices is reduced as one driving device applies a driving current to light sources of a plurality of dimming blocks. Furthermore, an optical defect due to the arrangement of the driving devices may also be reduced.

The plurality of driving devices 500 may include various topology circuits to perform the active matrix scheme based operation.

For example, as shown in FIG. 17, each of the plurality of driving devices 500 may include a pair of 1C2T topology circuits.

Each of the driving devices 500 may include a first driving transistor Tdr1, a first switching transistor Tsw1, a first storage capacitor Cs1, a second driving transistor Tdr2, a second switching transistor Tsw2, and a second storage capacitor Cs2.

Each of the first and second driving transistors Tdr1 and Tdr2, the first and second switching transistors Tsw1 and Tsw2, and first and second storage capacitors Cs1 and Cs2 may be the same as the driving transistor Tdr, the switching transistor Tsw, and the storage capacitor Cs as shown in FIG. 11.

The first driving transistor Tdr1, the first switching transistor Tsw1, and the first storage capacitor Cs1 may apply a driving current to light sources of a different dimming block from that of the second driving transistor Tdr2, the second switching transistor Tsw2, and the second storage capacitor Cs2.

A circuit as shown in FIG. 17 is an example of the driving device 500, without being limited thereto. For example, the driving device 500 may include a 3T1C topology circuit obtained by adding a transistor to compensate for body effect of the driving transistors Tdr1 and Tdr2.

The driving device 500 may be provided, for example, in a single chip in which the circuit shown in FIG. 17 is integrated. In other words, the circuit shown in FIG. 17 may be integrated in a single semiconductor chip.

The driving device 500 is arranged so that the dark region from the arrangement of the driving device 500 is not displayed on the screen 12 of the display apparatus 10.

Figure 18:
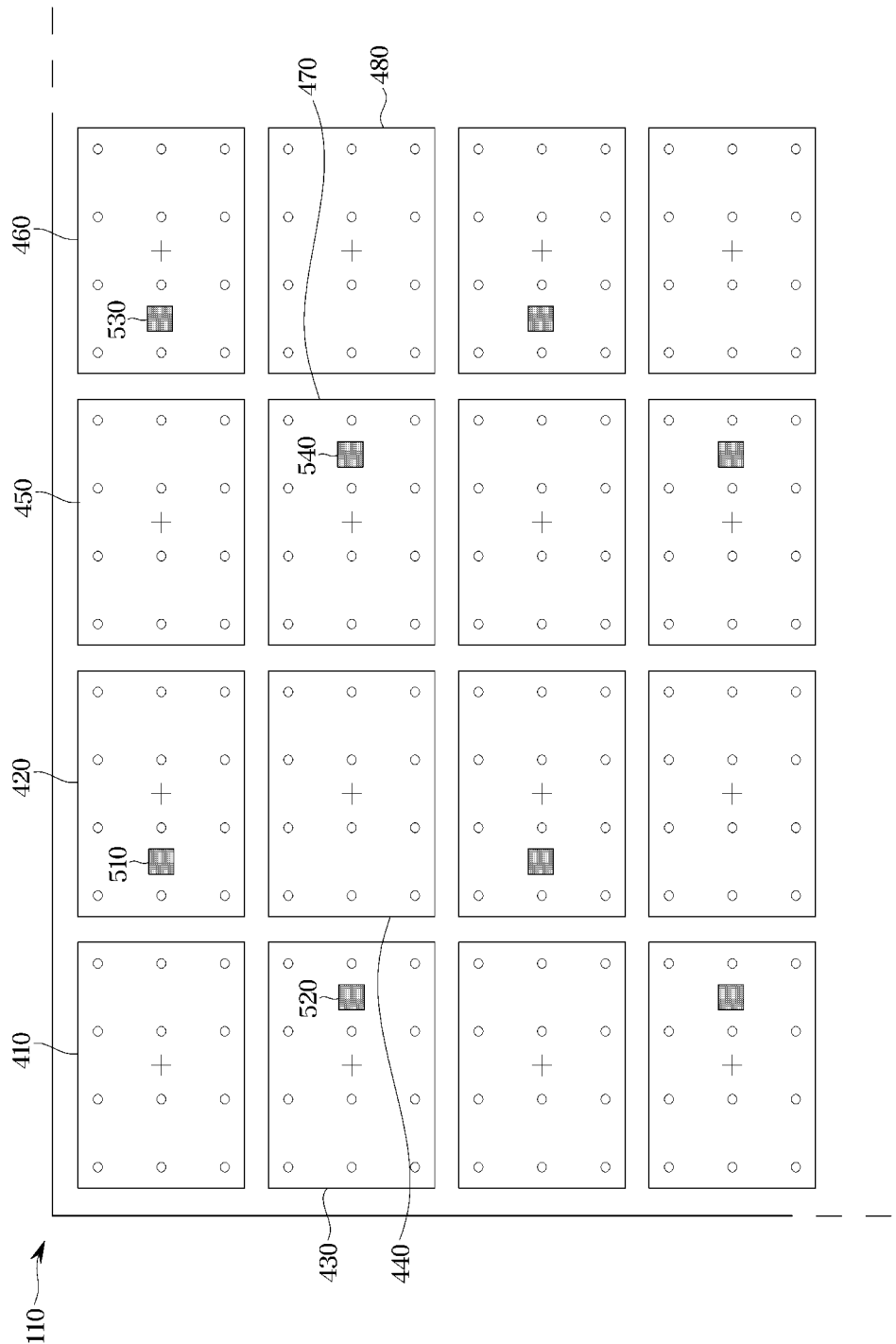
FIG. 18 is a plan view of driving devices included in a display apparatus, according to an embodiment.

FIG. 18 is a plan view of driving devices included in a display apparatus, according to an embodiment.

Referring to FIG. 18, the light source module 110 includes the plurality of light sources 111, which are arranged on the substrate 112 in the form of a matrix.

In this case, the plurality of light sources 111 may be classified into the plurality of dimming blocks 200. In other words, the front surface (the surface from which light is emitted) of the light source module 110 may be partitioned into the plurality of dimming areas 400 occupied by the plurality of dimming blocks 200.

Furthermore, the light source module 110 may further include the plurality of driving devices 500 for applying driving currents to light sources, and each of the plurality of driving devices 500 may apply a driving current to light sources included in two dimming blocks. Each of the driving devices 500 is located within two dimming areas of two dimming blocks.

To prevent or suppress an optical defect due to arrangement of the driving devices 500, the driving devices 500 may be irregularly arranged in the dimming areas. Relative positions of the driving devices in the different dimming blocks may be different from one another.

For example, as shown in FIG. 18, the front surface (a surface from which light is emitted) of the light source module 110 is partitioned into the first dimming area 410, the second dimming area 420, the third dimming area 430, the fourth dimming area 440, the fifth dimming area 450, the sixth dimming area 460, the seventh dimming area 470, the eighth dimming area 480, etc.

Light sources in two dimming areas are driven by a single driving device. In other words, a driving device may apply a driving current to a plurality of light sources (24 light sources as shown in FIG. 18) arranged in two dimming areas. The first driving device 510 may apply a driving current to light sources in the first and second dimming areas 410 and 420, the second driving device 520 may apply a driving current to light sources in the third and fourth dimming areas 430 and 440, the third driving device 530 may apply a driving current to light sources in the fifth and sixth dimming areas 450 and 460, and the fourth driving device 540 may apply a driving current to light sources in the seventh and eighth dimming areas 470 and 480.

In this case, the first driving device 510 is located in the second dimming area 420, the second driving device 520 is located in the third dimming area 430, the third driving device 530 is located in the sixth dimming area 460, and the fourth driving device 540 is located in the seventh dimming area 470.

As such, no driving device is located in an adjacent dimming area to a dimming area where a driving device is located. Furthermore, a driving device is located in an adjacent dimming area to a dimming area where no driving device is located.

In other words, in the same row, dimming areas where driving devices are located and dimming areas where no driving device is located are alternately arranged. Furthermore, in the same column, dimming areas where driving devices are located and dimming areas where no driving device is located are alternately arranged.

The first driving device 510 is located on the left from the center of the second dimming area 420, and the second driving device 520 is located on the right from the center of the third dimming area 430. Furthermore, the third driving device 530 is located on the left from the center of the sixth dimming area 460, and the fourth driving device 540 is located on the right from the center of the seventh dimming area 470.

As shown in FIG. 18, driving devices may be arranged in a zigzag form along a pair of neighboring columns of dimming areas.

As such, arrangement of a driving device in a dimming area may be different from arrangement of the other driving device adjacent to the one driving device in another dimming area.

Figure 19:
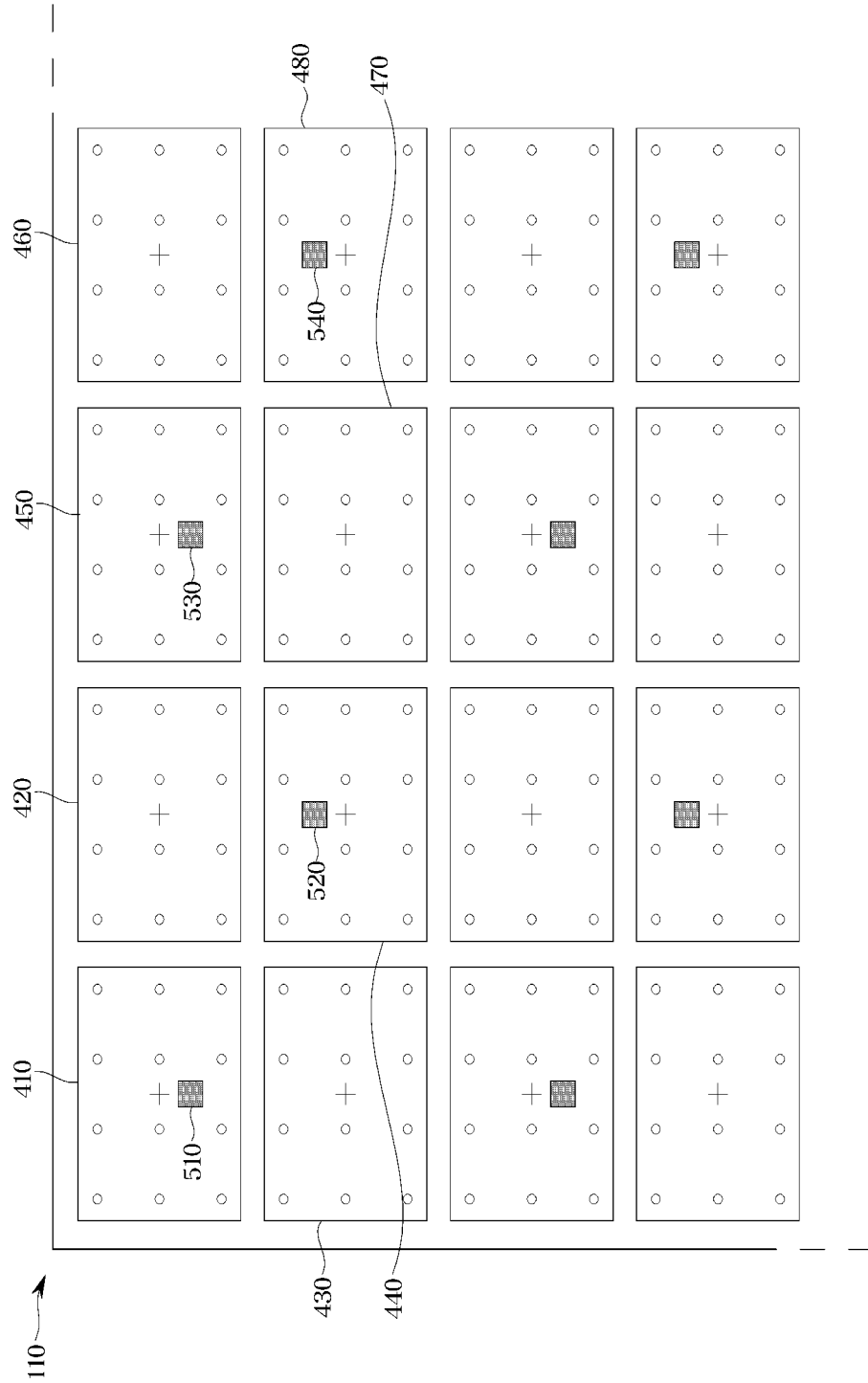
FIG. 19 is a plan view of driving devices included in a display apparatus, according to an embodiment.

FIG. 19 is a plan view of driving devices included in a display apparatus, according to an embodiment.

As shown in FIG. 19, the first driving device 510 may be located in a lower portion of the first dimming area 410, the second driving device 520 may be located in an upper portion of the fourth dimming area 440, the third driving device 530 may be located in a lower portion of the fifth dimming area 450, and the fourth driving device 540 may be located in an upper portion of the eighth dimming area 480.

As such, dimming areas where driving devices are located and dimming areas where no driving device is located are alternately arranged.

Furthermore, arrangement of a driving device in a dimming area may be different from arrangement of the other driving device adjacent to the one driving device in another dimming area.

With this arrangement of the driving devices 500, an optical defect due to the driving devices 500 may be prevented or suppressed.

Figure 20:
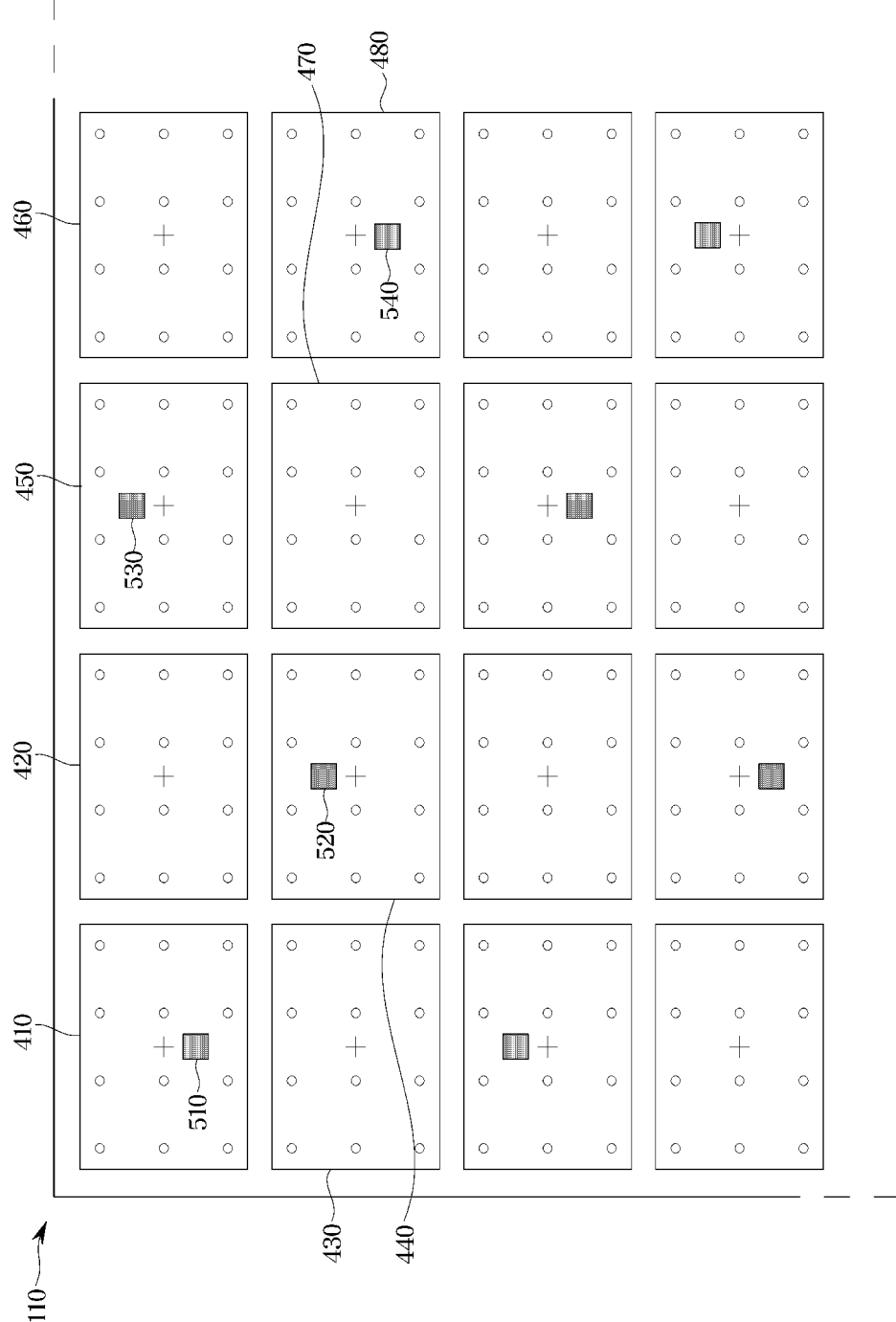
FIG. 20 is a plan view of driving devices included in a display apparatus, according to an embodiment.

FIG. 20 is a plan view of driving devices included in a display apparatus, according to an embodiment.

As shown in FIG. 20, the first driving device 510 may be located in a lower portion of the first dimming area 410, the second driving device 520 may be located in an upper portion of the fourth dimming area 440, the third driving device 530 may be located in an upper portion of the fifth dimming area 450, and the fourth driving device 540 may be located in a lower portion of the eighth dimming area 480.

As such, dimming areas where driving devices are located and dimming areas where no driving device is located are alternately arranged.

Furthermore, arrangement of a driving device in a dimming area may be different from arrangement of the other driving device adjacent to the one driving device in another dimming area.

Figure 21:
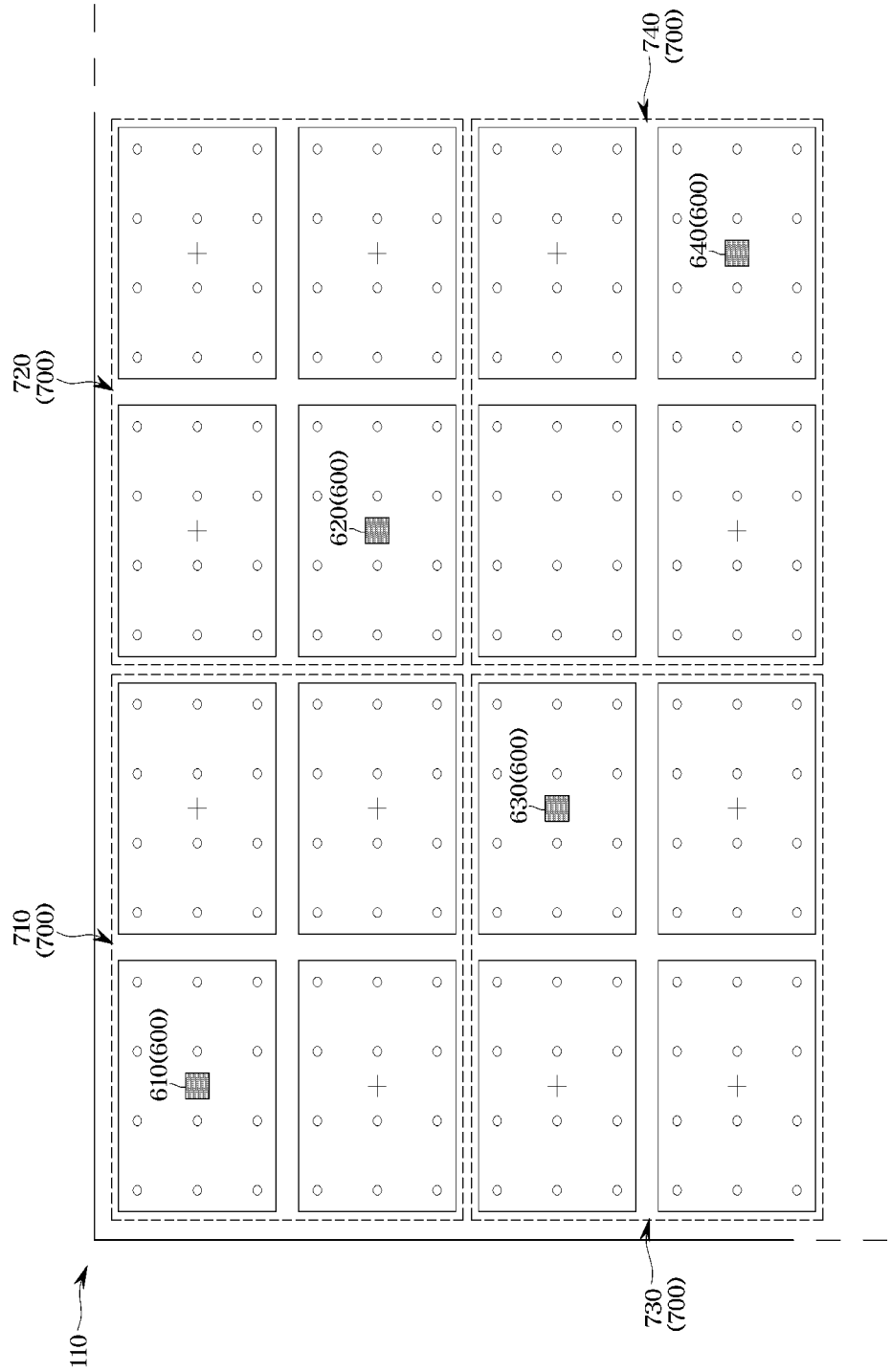
FIG. 21 is a plan view of driving devices included in a display apparatus, according to an embodiment.

FIG. 21 is a plan view of driving devices included in a display apparatus, according to an embodiment.

Referring to FIG. 21, the display apparatus 10 includes a plurality of driving devices 600 (610, 620, 630, and 640), and the plurality of light sources 111.

Each of the driving devices 600 may apply a driving current to light sources included in four dimming blocks. Herein, an area defined by light sources included in four dimming blocks driven by a single driving device may be defined as a driving area 700.

For example, the first driving device 610 may apply a driving current to light sources arranged in a first driving area 710 including four dimming blocks, and the second driving device 620 may apply a driving current to light sources arranged in a second driving area 720 including four dimming blocks. Furthermore, the third driving device 630 may apply a driving current to light sources arranged in a third driving area 730 including four dimming blocks, and the fourth driving device 640 may apply a driving current to light sources arranged in a fourth driving area 740 including four dimming blocks.

Arrangement of driving devices 600 is different depending on the driving area 700. A location of a driving device in a driving area is different from a location of a driving device in another driving area adjacent to the former driving area.

For example, the first driving device 610 may be located in an upper left portion of the first driving area 710, and the second driving device 620 may be located in a lower left portion of the second driving area 720. The third driving device 630 may be located in an upper right portion of the third driving area 730, and the fourth driving device 640 may be located in a lower right portion of the fourth driving area 740.

With this arrangement of the driving devices 600, an optical defect due to the driving devices 600 may be prevented or suppressed.

A display apparatus according to an embodiment includes a liquid crystal panel and a light apparatus. In this case, the light apparatus may include a substrate; a plurality of dimming blocks, each of the plurality of dimming blocks including at least one light source provided on a first surface of the substrate; and a plurality of driving devices provided on the first surface of the substrate, each of the plurality of driving devices applying a driving current to the at least one light source included in each of the plurality of dimming blocks. Furthermore, the plurality of driving devices may be arranged at different relative locations within a plurality of dimming areas defined by the plurality of dimming blocks, respectively.

For example, an arrangement of a driving device in one dimming area of the plurality of dimming areas is different from arrangements of driving devices in other dimming areas adjacent to the one dimming area.

For example, the plurality of dimming areas may be arranged in a plurality of rows and a plurality of columns, and an arrangement of a driving device in one dimming area of the plurality of dimming areas may be different from arrangements of driving devices in other dimming areas arranged in the same row or column as the one dimming area and adjacent to the one dimming area.

For example, one driving device of the plurality of driving devices may be arranged out of (i.e., outside) a virtual line defined by two driving devices closest to the one driving device.

Accordingly, an optical defect due to the plurality of driving devices may be prevented or suppressed.

The plurality of dimming blocks may emit light with at least different brightnesses. In other words, local dimming is implemented.

Each of the plurality of driving devices may apply a driving current to light sources included in at least two dimming blocks.

Accordingly, the number of the plurality of driving devices may be reduced, and furthermore, an optical defect due to the plurality of driving devices may be reduced as well.

One driving device of the plurality of driving devices may be arranged in a dimming area defined by one dimming block of the at least two dimming blocks.

In this case, a dimming area where the driving device is arranged and a dimming area where the one driving device is not arranged may be alternately arranged.

Furthermore, an arrangement of a driving device in a driving area defined by the at least two dimming blocks may be different from arrangements of driving devices in other driving areas adjacent to the driving area.

Accordingly, an optical defect due to the plurality of driving devices may be prevented or suppressed.

A dimming driver may be further included on a second surface of the substrate to provide a dimming signal to the plurality of driving devices.

Accordingly, efficient wiring between the dimming driver and a control assembly/power assembly may be possible.

The dimming driver may provide the dimming signal to the plurality of driving devices in an active matrix scheme.

For example, the plurality of driving devices may be arranged in a plurality of rows and a plurality of columns, and the dimming driver may provide a scan signal to driving devices arranged in one of the plurality of rows and provide the dimming signal to driving devices arranged in the plurality of columns.

Accordingly, the number of pins for the dimming driver to provide a dimming signal to a plurality of driving devices is reduced.

The at least one light source may include an LED directly contacting wiring on the substrate and an optical dome covering the LED. The LED has a DBR formed on a surface from which light is emitted Accordingly, the LED may emit more intense light in a lateral direction than in the perpendicular direction.

The embodiments of the disclosure may be implemented in the form of recording media for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. A person of ordinary skill in the art would recognize that the disclosure may be practiced in other forms than the embodiments as described above without changing the technical idea or essential features of the disclosure. The above embodiments are only by way of example, and may not be interpreted in a limited sense.

What is claimed is:

1. A display apparatus comprising:
a liquid crystal panel;
a plurality of light sources configured to emit light;
a substrate comprising a plurality of driving areas on the substrate, each driving area of the plurality of driving areas comprising a plurality of dimming blocks, and each dimming block of the plurality of dimming blocks comprising at least one light source of the plurality of light sources; and
a plurality of driving devices, each driving device of the plurality of driving devices being provided in one respective driving area of the plurality of driving areas and being configured to control a driving current of the at least one light source in each dimming block in the respective driving area, each driving device of the plurality of driving devices being disposed in a dimming area corresponding to one respective dimming block of the plurality of dimming blocks,
wherein a first driving device of the plurality of driving devices is disposed at a first position in a first dimming area of a first driving area of the plurality of driving areas,
a second driving device of the plurality of driving devices is disposed at a second position in a second dimming area of a second driving area of the plurality of driving areas, the second driving area being directly adjacent to the first driving area,
the first driving area and the second driving area are adjacent to each other, and
the first position and the second position are located in relatively different positions of the first dimming area and the second dimming area, respectively,
the first dimming area and the second dimming area are located in relatively different positions of the first driving area and the second driving area, respectively, the plurality of light sources are disposed in a plurality of rows and a plurality of columns,
light sources of each row of the plurality of rows are disposed in a straight line, and
light sources of each column of the plurality of columns are disposed in a straight line.

2. The display apparatus according to claim 1, wherein each driving device of the plurality of driving devices is configured to control a driving current of light sources in one respective driving area.

3. The display apparatus according to claim 2, wherein each driving device of the plurality of driving devices is configured to supply the same driving current to the at least one light source in each dimming block in the respective driving area, and
each driving device of the plurality of driving devices is configured to supply different driving currents to the at least one light source in different dimming blocks in the respective driving area.

4. The display apparatus according to claim 1, wherein each driving area of the plurality of driving areas comprises four dimming blocks.

5. The display apparatus according to claim 1, wherein the plurality of driving devices and the plurality of light sources are provided on a first surface of the substrate.

6. The display apparatus according to claim 5, wherein each driving device of the plurality of driving devices is configured to receive a signal through a connector disposed on a second side of the substrate.

7. The display apparatus according to claim 1, wherein the first position is located on an upper half area of the first dimming area, and
the second position is located on a lower half area of the second dimming area.

8. The display apparatus according to claim 1, wherein the first position is located on a right half area of the first dimming area, and
the second position is located on a left half area of the second dimming area.

9. The display apparatus according to claim 1, wherein a position of the first dimming area in the first driving area and a position of the second dimming area in the second driving area are relatively different from each other in the first driving area and the second driving area, respectively.

10. The display apparatus according to claim 1, wherein each driving device of the plurality of driving devices comprises:
a first transistor;
a capacitor coupled to a control terminal of the first transistor; and
a second transistor coupled to the control terminal of the first transistor.

11. The display apparatus according to claim 1, wherein the plurality of driving devices is controlled by an active matrix method.

12. The display apparatus according to claim 1, wherein a third driving device of the plurality of driving devices is disposed at a third position in a third dimming area of a third driving area of the plurality of driving areas,
the second driving area and the third driving area are adjacent to each other, and
the second position and the third position are located in relatively different positions of the second dimming area and the third dimming area, respectively.

13. The display apparatus according to claim 12, wherein the first position is located on an upper half area of the first dimming area, the second position is located on a lower half area of the second dimming area, and the third position is located on an upper half area of the third dimming area.

14. The display apparatus according to claim 12, wherein the first position is located on a right half area of the first dimming area, the second position is located on a left half area of the second dimming area, and the third position is located on a right half area of the third dimming area.

15. The display apparatus according to claim 12, wherein a position of the first dimming area in the first driving area and a position of the second dimming area in the second driving area are relatively different from each other in the first driving area and the second driving area, respectively, and the position of the second dimming area in the second driving area and a position of the third dimming area in the third driving area are relatively different from each other in the second driving area and the third driving area, respectively.

16. The display apparatus according to claim 15, wherein the position of the first dimming area in the first driving area is relatively same with the position of the third dimming area in the third driving area.

17. The display apparatus according to claim 1, wherein each light source of the plurality of light sources comprises a light emitting diode disposed on the substrate in a Chip On Board (COB) method and an optical dome having a vertical cross section that is a bow shape or a semicircle shape.

18. The display apparatus according to claim 17, wherein an intensity of a first light beam which is emitted from the light emitting diode in a first direction perpendicular to the substrate is less than an intensity of a second light beam which is emitted from the light emitting diode in a second direction that is different from the first direction.

19. A light apparatus comprising:

a plurality of light sources configured to emit light;

a substrate comprising a plurality of driving areas on the substrate, each driving area of the plurality of driving areas comprising a plurality of dimming blocks, and each dimming block of the plurality of dimming blocks comprising at least one light source of the plurality of light sources; and a plurality of driving devices, each driving device of the plurality of driving devices being provided in one respective driving area of the plurality of driving areas and being configured to control a driving current of the at least one light source in each dimming block in the respective driving area, each driving device of the plurality of driving devices being disposed in a dimming area corresponding to one respective dimming block of the plurality of dimming blocks, wherein a first driving device of the plurality of driving devices is disposed at a first position in a first dimming area of a first driving area of the plurality of driving areas, a second driving device of the plurality of driving devices is disposed at a second position in a second dimming area of a second driving area of the plurality of driving areas, the second driving area being directly adjacent to the first driving area, the first driving area and the second driving area are adjacent to each other, and the first position and the second position are located in relatively different positions of the first dimming area and the second dimming area, respectively, the first dimming area and the second dimming area are located in relatively different positions of the first driving area and the second driving area, respectively, the plurality of light sources are disposed in a plurality of rows and a plurality of columns, light sources of each row of the plurality of rows are disposed in a straight line, and light sources of each column of the plurality of columns are disposed in a straight line.

* * * * *